United States Patent
Held et al.

(10) Patent No.: US 10,670,497 B2
(45) Date of Patent: *Jun. 2, 2020

(54) DEVICE AND METHOD FOR ANALYSIS OF TYRES COMPRISING FIRST AND SECOND IMAGE ACQUISTION SYSTEMS

(71) Applicant: PIRELLI TYRE S.P.A., Milan (IT)

(72) Inventors: Alessandro Held, Milan (IT); Vincenzo Boffa, Milan (IT); Fabio Regoli, Milan (IT); Valeriano Ballardini, Imola (IT); Giuseppe Casadio Tozzi, Imola (IT)

(73) Assignee: PIRELLI TYRE S.P.A, Milan (IT)

( * ) Notice: Subject to any disclaimer, the term of this patent is extended or adjusted under 35 U.S.C. 154(b) by 157 days.

This patent is subject to a terminal disclaimer.

(21) Appl. No.: 15/776,398

(22) PCT Filed: Dec. 14, 2016

(86) PCT No.: PCT/IB2016/057620
§ 371 (c)(1),
(2) Date: May 15, 2018

(87) PCT Pub. No.: WO2017/103814
PCT Pub. Date: Jun. 22, 2017

(65) Prior Publication Data
US 2018/0299353 A1    Oct. 18, 2018

(30) Foreign Application Priority Data

Dec. 16, 2015   (IT) .......................... 102015000083776

(51) Int. Cl.
*G01M 17/02*    (2006.01)
*G01N 21/95*    (2006.01)
(Continued)

(52) U.S. Cl.
CPC ....... *G01M 17/027* (2013.01); *B29D 30/0633* (2013.01); *G01N 21/9515* (2013.01); *B29D 2030/0066* (2013.01); *G01N 21/952* (2013.01)

(58) Field of Classification Search
CPC ............. B60C 11/1204; B60C 11/1236; B60C 11/0306; B60C 11/0304;
(Continued)

(56) References Cited

U.S. PATENT DOCUMENTS 3,722,270 A    3/1973   Sperberg
4,506,981 A    3/1985   Hoff, Jr.
(Continued)

FOREIGN PATENT DOCUMENTS

CN    1624420 A    6/2005
CN    101672627 A    3/2010
(Continued)

OTHER PUBLICATIONS

International Search Report for PCT/IB2016/057620 filed on Dec. 15, 2016 on behalf of Pirelli Tyre S.P.A. dated Mar. 23, 2017. 3 pages.

(Continued)

*Primary Examiner* — Andre J Allen
(74) *Attorney, Agent, or Firm* — Steinfl + Bruno LLP

(57) ABSTRACT

Device and method for analysis of tyres are presented. The device includes a support frame, a flange, and first/second image acquisition systems. According to one aspect, the first acquisition system is two-dimensional and includes a first camera having a first optical axis, a first focal plane, a first focal point, and a first depth of field, and a first illumination system that illuminates around the first focal point. According to another aspect, the second image acquisition system is three-dimensional and includes a second camera having a second optical axis, a second focal plane, and a second depth (Continued)

of field, and a second illumination system. A translation plane, substantially orthogonal to the first optical axis, is defined by the first focal point, and an intersection between the second optical axis and the second depth of field.

23 Claims, 14 Drawing Sheets

(51) Int. Cl.
B29D 30/06 (2006.01)
G01N 21/952 (2006.01)
B29D 30/00 (2006.01)

(58) Field of Classification Search
CPC ..... B60C 2011/1213; B60C 2011/1209; B60C 2011/0341; B60C 2011/0358; B60C 2011/0372; B60C 2011/0388; B60C 1/00; B60C 2011/0383; B60C 11/0302; B60C 11/0309; B60C 11/1263; B60C 11/13; B60C 1/0016; B60C 2011/0365; B60C 2011/0381; B60C 2011/1227; B60C 11/1281; B60C 1/0025; B60C 2009/0078; B60C 2011/0367; B60C 2011/1254; B60C 2011/1268; B60C 11/0083; B60C 11/032; B60C 11/04; B60C 11/042; B60C 11/12; B60C 11/1384; B60C 11/1392; B60C 13/00; B60C 13/02; B60C 2009/0092; B60C 2011/0353; B60C 2011/0362; B60C 23/0493; B60C 9/0007; B60C 9/0042; B60C 11/0008; B60C 11/0075; B60C 11/01; B60C 11/03; B60C 11/0311; B60C 11/11; B60C 11/1218; B60C 13/001; B60C 15/06; B60C 2011/0016; B60C 2011/0025; B60C 2011/0346; B60C 2011/0348; B60C 2011/0351; B60C 2011/0355; B60C 2011/036; B60C 2011/0369; B60C 2011/0374; B60C 2011/0386; B60C 2011/039; B60C 2013/007; B60C 23/20; B60C 3/04; B60C 5/00; B60C 9/005; B60C 9/18; B60C 9/28; B60C 11/00; B60C 11/005; B60C 11/02; B60C 11/0316; B60C 11/0327; B60C 11/033; B60C 11/045; B60C 11/125; B60C 11/1259; B60C 11/1376; B60C 11/1625; B60C 11/18; B60C 11/24; B60C 15/0027; B60C 15/0045; B60C 15/02; B60C 15/0209; B60C 15/0603; B60C 15/0632; B60C 15/0635; B60C 17/0009; B60C 19/00; B60C 19/122; B60C 19/125; B60C 2001/005; B60C 2001/0058; B60C 2001/0075; B60C 2009/0014; B60C 2009/0021; B60C 2009/0035; B60C 2009/0085; B60C 2009/2048; B60C 2009/2051; B60C 2009/2058; B60C 2009/2083; B60C 2009/2096; B60C 2009/266; B60C 2009/283; B60C 2011/0033; B60C 2011/013; B60C 2011/0334; B60C 2011/1245; B60C 2011/129; B60C 2011/1295; B60C 2013/006; B60C 2015/042; B60C 2015/061; B60C 2015/0689; B60C 2017/0072; B60C 2200/04; B60C 2200/06; B60C 2200/065; B60C 23/00; B60C 23/041; B60C 23/0447; B60C 23/0452; B60C 23/0461; B60C 23/0471; B60C 23/0488; B60C 23/0489; B60C 25/0533; B60C 25/16; B60C 5/16; B60C 9/00; B60C 9/0028; B60C 9/0238; B60C 9/0292; B60C 9/06; B60C 9/08; B60C 9/2009; B60C 9/22; G01M 17/027; G01M 17/021; G01M 17/022; G01M 17/02; G01M 17/025; G01M 17/024; G01M 17/10; G01M 17/08; G01M 17/0076; G01M 17/013; G01M 17/03; G01M 17/04; G01M 17/06; G01M 17/08; G01M 1/02; G01M 1/045; G01M 1/12; G01M 1/225; G01M 3/40; G01M 5/0091; G01M 7/02; G01M 99/00; G01M 99/002
USPC ................................................ 73/146–146.8
See application file for complete search history.

(56) References Cited

U.S. PATENT DOCUMENTS

| | | |
|---|---|---|
| 6,327,374 B1 | 12/2001 | Piironen et al. |
| 6,680,471 B2 | 1/2004 | Kokubu et al. |
| 6,840,097 B1 | 1/2005 | Huber et al. |
| 7,187,437 B2 | 3/2007 | Shaw et al. |
| 7,343,789 B2 | 3/2008 | Fujisawa et al. |
| 7,421,108 B2 | 9/2008 | Kaneko et al. |
| 7,466,430 B2 | 12/2008 | Braghiroli |
| 7,568,385 B2 | 8/2009 | Maehner et al. |
| 8,284,393 B2 | 10/2012 | Takahashi et al. |
| 8,618,924 B2 | 12/2013 | Fujisawa |
| 8,824,878 B2 | 9/2014 | Mizukusa et al. |
| 9,097,514 B2 | 8/2015 | Takahashi et al. |
| 9,175,952 B2 | 11/2015 | Mizutani et al. |
| 9,239,274 B2 | 1/2016 | Joly |
| 9,719,944 B2 | 8/2017 | Boffa et al. |
| 10,488,302 B2 | 11/2019 | Held et al. |
| 2001/0024279 A1 | 9/2001 | Kaneko et al. |
| 2004/0212795 A1 | 10/2004 | Steinbichler et al. |
| 2005/0052637 A1 | 3/2005 | Shaw et al. |
| 2005/0052657 A1 | 3/2005 | Braghiroli |
| 2005/0264796 A1 | 12/2005 | Shaw et al. |
| 2007/0093981 A1 | 4/2007 | Reynolds et al. |
| 2009/0282905 A1 | 11/2009 | Dengler et al. |
| 2010/0002244 A1 | 1/2010 | Iino et al. |
| 2010/0013916 A1* | 1/2010 | Maehner ............. G01M 17/027 348/125 |
| 2011/0018999 A1 | 1/2011 | Joly et al. |
| 2011/0188731 A1 | 8/2011 | Sekiguchi |
| 2011/0288814 A1 | 11/2011 | Mizutani et al. |
| 2012/0134656 A1 | 5/2012 | Mizukusa et al. |
| 2013/0093879 A1* | 4/2013 | Bertolotti ................. F03D 1/06 348/125 |
| 2014/0373614 A1 | 12/2014 | Steinbichler et al. |
| 2015/0226644 A1 | 8/2015 | Boffa et al. |
| 2016/0084739 A1* | 3/2016 | Park .................... G01M 17/027 73/146 |
| 2016/0238488 A1 | 8/2016 | Charlat et al. |
| 2016/0377556 A1 | 12/2016 | Boffa et al. |
| 2017/0370807 A1 | 12/2017 | Boffa et al. |
| 2018/0143102 A1 | 5/2018 | Boffa et al. |
| 2018/0299352 A1* | 10/2018 | Rose .................... B60C 11/246 |
| 2018/0328819 A1 | 11/2018 | Boffa et al. |
| 2018/0364134 A1 | 12/2018 | Held et al. |
| 2018/0372590 A1* | 12/2018 | Held .................... G01M 17/027 |
| 2018/0372592 A1 | 12/2018 | Held et al. |
| 2019/0017902 A1 | 1/2019 | Held et al. |
| 2019/0086293 A1 | 3/2019 | Held et al. |
| 2019/0318466 A1 | 10/2019 | Ghidotti Piovan et al. |

FOREIGN PATENT DOCUMENTS

| | | |
|---|---|---|
| CN | 102053042 A | 5/2011 |
| CN | 102203578 A | 9/2011 |
| CN | 102313749 A | 1/2012 |

(56) References Cited

FOREIGN PATENT DOCUMENTS

| | | |
|---|---|---|
| CN | 102478527 A | 5/2012 |
| CN | 103038601 A | 4/2013 |
| CN | 203011704 U | 6/2013 |
| DE | 4231578 A1 | 3/1994 |
| EP | 1030173 A1 | 8/2000 |
| EP | 1120640 A1 | 8/2001 |
| EP | 2078955 A1 | 7/2009 |
| EP | 2322899 A1 | 5/2011 |
| JP | 2008203258 A | 9/2008 |
| JP | 2009139268 A | 6/2009 |
| JP | 2010266259 A | 11/2010 |
| JP | 2011038896 A | 2/2011 |
| WO | 2008/053742 A1 | 5/2008 |
| WO | 2010/024254 A1 | 3/2010 |
| WO | 2015/004587 A1 | 1/2015 |
| WO | 2015/044196 A1 | 4/2015 |
| WO | 2015/079370 A1 | 6/2015 |
| WO | 2017/103814 A1 | 6/2017 |

OTHER PUBLICATIONS

Written Opinion for PCT/IB2016/057620 filed on Dec. 15, 2016 on behalf of Pirelli Tyre S.P.A. dated Mar. 23, 2017. 6 pages.

EPO Communication pursuant to Article 94(3) EPC for EP Application No. 16836051 filed on behalf of Pirelli Tyre S.P.A Mail Date: Jul. 24, 2019 6 pages.

EPO Communication Office Action for EP Application No. 16836051 filed on behalf of Pirelli Tyre S.P.A. dated Jan. 14, 2020. 4 pages.

First Office Action for Chinese Application No. 201680070465.1 on behalf of Pirelli Tyre S.P.A. dated Dec. 4, 2019. 14 pages., Chinese original + English translation.

First Office Action for Chinese Application No. 201680081202.0 filed on behalf of Pirelli Tyre S.P.A. dated Jan. 7, 2020. 19 pages, Chinese + English translation.

First Office Action for Chinese Application No. 201680081671.2 filed on Dec. 28, 2016 on behalf of Pirelli Tyre S.P.A. dated Sep. 27, 2019. 12 Pages. Chinese Original + English.

International Search Report for International Application No. PCT/IB2016/058038 filed Dec. 28, 2016 on behalf of Pirelli Tyre S.P.A. dated May 11, 2017. 3 pages.

International Search Report for International Patent Application No. PCT/IB2016/057712, filed Dec. 16, 2016 on behalf of Pirelli Tyre S.P.A. dated Mar. 30, 2017. 4 pages.

International Search Report for International Patent Application No. PCT/IB2016/058036 filed Dec. 28, 2016 on behalf of Pirelli Tyre S.P.A. dated Jul. 21, 2017. 5 pages.

International Search Report for International Patent Application No. PCT/IB2016/058052 filed Dec. 28, 2016 on behalf of Pirelli Tyre S.P.A. dated Jun. 16, 2017. 5 pages.

Japanese Office Action for Japanese Application No. 2018532287. dated Jan. 28, 2020. 8 pages.

Non-Final Office Action for U.S. Appl. No. 15/780,602, filed May 31, 2018 on behalf of Pirelli Tyre S.P.A. dated Sep. 13, 2019. 15 pages.

Non-Final Office Action for U.S. Appl. No. 16/064,448, filed Jun. 20, 2018 on behalf of Pirelli Tyre S.P.A. dated Jan. 23, 2020 16 pages.

Non-Final Office Action for U.S. Appl. No. 16/064,982, filed Jun. 21, 2018 on behalf of Pirelli Tyre S.P.A. dated Feb. 11, 2020. 11 pages.

Non-Final Office Action for U.S. Appl. No. 16/066,264, filed Jun. 26, 2018, on behalf of Pirelli Tyre S.P.A. dated Jan. 16, 2019. 8 pages.

Notice of Allowance for U.S. Appl. No. 16/066,264, filed Jun. 26, 2018 on behalf of Pirelli Tyre S.P.A. dated Aug. 1, 2019. 8 pages.

Notice of Allowance for U.S. Appl. No. 15/780,602, filed May 31, 2018 on behalf of Pirelli Tyre S.P.A. dated Nov. 20, 2019. 8 Pages.

Written Opinion for International Application No. PCT/IB2016/058038 filed Dec. 28, 2016 on behalf of Pirelli Tyre S.P.A. dated May 11, 2017. 6 pages.

Written Opinion for International Patent Application No. PCT/IB2016/057712 filed Dec. 16, 2016 on behalf of Pirelli Tyre S.P.A. dated Mar. 30, 2017. 6 pages.

Written Opinion for International Patent Application No. PCT/IB2016/058036 filed Dec. 28, 2016 on behalf of Pirelli Tyre S.P.A. dated Jul. 21, 2017. 7 pages.

Written Opinion for International Patent Application No. PCT/IB2016/058052 filed Dec. 28, 2016 on behalf of Pirelli Tyre S.P.A. dated Jun. 16, 2017. 8 pages.

\* cited by examiner

DEVICE AND METHOD FOR ANALYSIS OF TYRES COMPRISING FIRST AND SECOND IMAGE ACQUISTION SYSTEMS

CROSS REFERENCE TO RELATED APPLICATIONS

The present application is the U.S. National Stage of International Patent Application No. PCT/IB2016/057620 filed on Dec. 14, 2016 which, in turn, claims priority to Italian Application No. 102015000083776 filed on Dec. 16, 2015.

The present invention relates to a device for the analysis of tyres in a tyre production line, in particular by the acquisition of images of the surface of a tyre and further processing thereof, for example for checking the possible presence of detectable defects on the surface of a tyre.

"Tyre" typically means the finished tyre, i.e. after the building, moulding and vulcanisation steps, but possibly also the green tyre after the building step and before the moulding and/or vulcanisation steps.

Typically, a tyre has a substantially toroidal structure around an axis of rotation of the same during operation, and has an axial middle line plane orthogonal to the axis of rotation, said plane typically being a geometrical (substantial) symmetry plane (for example, ignoring any minor asymmetries, such as tread pattern and/or the inner structure).

Outer or inner surface of the tyre denote the surface which remains visible after the coupling of the tyre with the mounting rim thereof and the one no longer visible after said coupling, respectively.

The terms "low", "high", "below" and "above" identify the relative position of an element, such as a component of a tyre, a tyre, an apparatus, a device, etc., with respect to the ground during use or of one of said elements with respect to another element.

By 'substantially orthogonal' with respect to geometric elements (such as straight lines, planes, surfaces, etc.) it is meant that these elements form an angle of 90°+/−15°, preferably 90°+/−10°.

By 'substantially parallel' with respect to said geometric elements it is meant that these elements form an angle of 0°+/−15°, preferably 0°+/−10°. The terms 'optical', 'light' and the like refer to an electromagnetic radiation used that has at least a portion of the spectrum falling in a widened neighbourhood of the optical band, and not necessarily strictly falling within the optical band (i.e. 400-700 nm), for example this widened neighbourhood of the optical band may range from ultraviolet to infrared (for example, a wavelength of between about 100 nm and about 1 μm).

By "digital image", or equivalently "image", it is generally meant a set of data, typically contained in a computer file, in which each tuple of coordinates (typically each pair of coordinates) of a finite set (typically two-dimensional and matrix, i.e. N rows×M columns) of tuples of spatial coordinates (each tuple corresponding to a pixel) is associated with a corresponding set of numerical values (which may be representative of different magnitudes). For example, in monochrome images (such as those in grey levels or 'greyscale'), such a set of values consists of a single value in a finite scale (typically 256 levels or tones), this value for example being representative of the luminosity (or intensity) level of the respective tuple of spatial coordinates when displayed. A further example is represented by colour images, in which the set of values represents the luminosity level of a plurality of colours or channels, typically the primary colours (for example red, green and blue in RGB coding and cyan, magenta, yellow and black in CMYK coding). The term 'image' does not necessarily imply the actual display of the same.

Any reference to a specific "digital image" (for example, the digital image initially acquired on the tyre) includes more generally any digital image obtainable through one or more digital processing of said specific digital image (such as, for example, filtering, equalization, smoothing, binarization, thresholding, morphological transformations (opening, etc.), derivative or integral calculations, etc.).

The term "two-dimensional image" or "2D" means a digital image each pixel of which is associated to information representative of the reflectivity/diffusivity and/or colour of the surface, such as the images detected from the common cameras or digital cameras (e.g. CCD).

The term "three-dimensional image" or "3D" means a digital image each pixel of which is associated to surface height information, for example the images obtained by the altimetric profile reconstruction technique of a surface through a triangulation processing of a two-dimensional matrix image of the surface illuminated by a laser light line.

"Digital camera" or in short "camera" denotes an optoelectronic device adapted to acquire a two-dimensional digital image and including a digital image sensor (or in short 'sensor'), which defines an image plane, and an objective (which for simplicity is assumed to be with cylindrical symmetry, although the invention is not limited only to these objectives).

'Sensor' means a set of photosensitive elements (called 'pixels') capable of transforming the incident light into an electric signal, for example by CCD or CMOS technology. The term pixel is used to denote both the single photosensitive element of the sensor, and the single element forming the digital image as defined above, each pixel of the sensor typically corresponding to a pixel of the image.

"Matrix camera" means a camera whose sensor has the pixels arranged according to a rectangular matrix having the two dimensions of comparable length (for example, the two dimensions differ by less than one order of magnitude, as in the 4×3 or 3×2 formats). Typically, the diagonal of the sensor matrix is long some tens of millimetres.

"Linear camera" means a camera whose sensor (referred to as 'linear sensor') has the pixels arranged in a rectangular matrix having a dimension much greater than the other, typically greater by at least two orders of magnitude. Typically, the number of rows of pixels of the sensor is between 1 and 4 and the number of columns is greater than 1000. The terms 'rows' and 'columns' are conventionally used and are interchangeable. A linear camera is characterised by an objective line, lying on the intersection between the focal plane of the camera and the plane (referred to as 'optical plane') orthogonal thereto and passing through the linear sensor, and is adapted to acquire images of linear surface portions arranged at the objective line (referred to as 'linear images' and having dimensions in pixels equal to the dimensions of the linear sensor). "Surface linear portion" means a surface portion having a much dimension size than the other dimension orthogonal thereto, typically greater by at least two orders of magnitude. The minor dimension of the linear surface portion is typically less than or equal to 0.1 mm.

"Optical axis" of an objective denotes the line along which a rotation symmetry of the objective exists.

"Focal plane" of a camera means is the plane of object points that are focused by the objective on the sensor, i.e. the rays originating from each object point of the focal plane converge in a respective point on the sensor plane (image plane).

'Depth of field' means the set of planes in a neighbourhood of the focal plane each point of which, when projected by the objective on the sensor plane, forms an image inscribed in a predetermined circle of confusion (for example having a diameter of 5-10 microns).

"Laser source having a linear beam" or in short, "linear laser source" means a laser source adapted to emit a beam having a cross section in the form of line, typically shaped as a straight segment.

"Propagation plane" of a linear laser source means the plane on which the linear beam propagates (said line lying on the propagation plane).

"Directional light radiation" incident in a point of a surface means a light radiation for which there is a conical solid angle having the point as a vertex and width smaller than or equal to n/8 steradian (preferably smaller than or equal to n/10 steradian) within which at least 75% of the total light power lies, preferably at least 90%, more preferably all of the incident light power in the point.

"Diffuse light radiation" refers to a non-directional light radiation.

"Grazing light radiation" incident in a point of a surface means a light radiation in which at least 75% (preferably at least 90%, more preferably 100%) of the total light power of the incident radiation in the point forms with a plane tangent to the surface in said point an angle of incidence smaller than or equal to 60°, preferably smaller than or equal to 45°.

"Building/production cycle time" means the time elapsing between the outlet of a built/finished tyre from the building/production plant and the outlet of the next tyre.

In the context of the production and building processes of tyres for vehicle wheels, it is particularly useful to perform quality inspections on manufactured products, with the aim to prevent defective tyres or tyres not meeting the design specifications from being put on the market, and/or to progressively adjust the apparatuses and machinery used so as to improve and optimise the execution of the operations carried out in the production process.

These quality inspections include for example those performed by human operators who dedicate a fixed time to a visual and tactile inspection of the tyre; if, in the light of his own experience and sensitivity, the operator were to suspect that the tyre does not meet certain quality standards, the same tyre is subjected to further inspections, through a more detailed human inspection and/or suitable equipment in order to deepen the evaluation of any structural and/or qualitative deficiencies.

US 2010/0002244 A1 describes a technique of inspection of a tyre surface able to safely discriminate different quality rubber pieces incorporated into the tyre surface. A first illumination unit includes a pair of first light projectors which project the light towards an objective line, respectively on opposite sides. A second illumination unit includes a pair of second light projectors which project the light towards the objective line in an opposite direction to the first illumination line and respectively, on opposite sides. The first and second illumination units illuminate alternately. A linear camera forms an image of a surface portion of the tyre corresponding to the objective line in synchronism with the respective lighting operations of the first and second illumination units.

US 2004/0212795 A1 describes a method for the measurement of a profile and/or a deformation of an object. The object is illuminated by a light emitted by a radiation source and consists, in particular, of coherent or partially coherent light, especially laser light. The light reflected by the object is received by a camera with an image sensor. In order to improve the image quality, a first image is created with a first configuration of the camera and/or the radiation source which is suitable for a first region of the image. Moreover, a second image is created with a second configuration of the camera and/or the radiation source which is suitable for a second region of the image. The two images are combined.

U.S. 6,680,471 B2 describes an apparatus capable of evenly illuminating the inner curved surface of a tyre by means of LEDs and CCD.

US 2012/0134656 A1 describes an illumination device and an inspection device of a tyre that can easily detect shape anomalies in a produced tyre.

WO 2015/044196 A1 describes a device for the acquisition of images of the inner surface of a tyre comprising illumination means, image acquisition means and a reflector optically interposed between the illumination means and the illuminated area of the tyre surface.

In the field of tyre quality control, the Applicant has set itself the problem of analysing the inner and/or outer surface of the tyre by the optical acquisition of digital images thereof and subsequent processing thereof, for example in order to detect the possible presence of defects on, or in the vicinity of, the surface. The defects sought may for example be irregularities on the surface of a tyre (unvulcanised compound, alterations in shape, etc.) structural unevenness, cuts, presence of foreign bodies on the surface, etc.

The Applicant has observed that for the inspection to be used "in line" within a plant for the production of tyres, the inspections itself should be performed in a reduced time, less than or corresponding to the cycle time, and with reduced costs and/or overall dimensions.

Within this context, the Applicant has perceived that it is advantageous to acquire and analyse images of different types of the same surface region of the tyre, for example at different definition, with different illuminations, etc. In particular, the Applicant considers it very advantageous to acquire both two-dimensional images and three-dimensional images of the same surface region.

For example, the 3D technology (in particular the high-definition, for example with resolution of less than or equal to 10 micron) resolution can be used to detect lacks or projections of material on the surface of the tyres, typically lack or bubbles, while the 2D technology (in particularly the high-definition) can be used to detect defects not visible in 3D, such as thin cuts and spots. Moreover, some features like embossing and knurls are detectable with both technologies.

The Applicant has realised that the quality control methods of the tyres with optical acquisition of images of the type described in the above documents are cumbersome in terms of consumption of time and/or space, thus substantially lending themselves to an execution thereof off the production line or, if in line, causing a lengthening of the cycle times and/or (direct and/or indirect) production costs.

Within the acquisition of digital images of a tyre surface for the analysis thereof in a production line, where the acquired digital images are of two types, for example two-dimensional images (2D) and three-dimensional images (3D) using laser triangulation technique, the Applicant has perceived that the time to scan the same surface region twice, for example for the 2D and 3D image, respectively, would imply a considerable lengthening of the total time of the tyre analysis.

The Applicant has finally found it advantageous to combine on a device, having a single support frame, two different acquisition systems where the area captured by the camera of the second system is put sufficiently in focus (i.e. lies in its depth of field) at least on a plane (referred to as 'translation plane') also passing by the focal plane of the camera of the first system and substantially orthogonal to the optical axis of the camera of the first system. In this way, by moving, relatively to the device, the surface of the tyre on such a translation plane or in the vicinity thereof (i.e. within the depth of field of the camera of the first system, as explained below), it is possible to simultaneously acquire the two different images of the same region of the tyre surface, which is locally substantially planar and lying in close proximity of such a translation plane, while keeping the device extremely compact.

According to a first aspect thereof, the invention relates to a device for the analysis of tyres comprising a support frame and a flange for attaching said support frame to a device movement member.

Preferably, a first acquisition system is provided for acquiring images of a surface of a tyre, said first acquisition system being mounted on said support frame.

Preferably, the first acquisition system comprises a first camera, having a first optical axis, a first focal plane and a first depth of field.

Preferably, the first acquisition system comprises a first illumination system adapted to illuminate around a first focal point which is situated on an intersection between said first optical axis and said first focal plane.

Preferably, a second acquisition system is provided for acquiring images of said surface, said second acquisition system being mounted on said support frame.

Preferably, the second image acquisition system comprises a second camera and a second illumination system.

Preferably, said second camera has a second optical axis, a second focal plane and a second depth of field.

Preferably, there is at one translation plane passing by said first focal point, substantially orthogonal to said first optical axis.

Preferably, said translation plane also passes through a first intersection region between said second optical axis and said second depth of field.

According to a second aspect thereof, the invention relates to a station for analysing tyres in a tyre production line.

Preferably, the station comprises a support adapted to support the tyre set on a sidewall and to rotate the tyre around a rotation axis thereof.

Preferably, the station comprises the device according to the invention.

Preferably, said device movement member is provided, on which said device is mounted, by means of said flange.

According to a third aspect thereof, the invention relates to a method for analysing tyres by means of the device according to the invention.

Preferably, it is contemplated that a region of said tyre surface is translated with respect to the device remaining lying on or in proximity to said at least one translation plane at least at said first focal point.

Preferably, said first acquisition system and second acquisition system are activated during said translation to acquire in parallel a respective series of images of a same series of distinct portions of said surface region.

The expression 'lying in the proximity to the translation plane at said first focal point' means that the surface region intersects said first optical axis at a point which lies within the first depth of field.

The Applicant believes that with the above solution, it is possible to carry out acquisitions of the same surface region in parallel (typically a globally circumferential region) with both technologies, thereby halving the time required and consequently the use of the device itself, while limiting the overall dimensions required by the device and/or by the relative analysis station, both during the operation and during inactivity.

The Applicant in fact believes that the combination of two different image acquisition systems on a single device, where at least one plane substantially orthogonal to the optical axis of the first system and passing through the focal point on the optical axis of the first system passes also by the region of (sufficient) focus of the optical axis of the second system, allows the simultaneous acquisition of images of two different types of the same surface region, keeping the device as a whole compact and/or with reduced weight (and thus easily manageable in space even in confined spaces and/or occupied by other devices and/or also with relatively high speeds). In fact, in order to acquire the two images of different type, it is possible to move the tyre surface with respect to the device along the translation plane or in its vicinity, so that once a surface portion has been acquired, for example by the first system, it moves with motion substantially orthogonal to the optical axis of the first system until it passes through the focal region of the second system for the respective acquisition, or vice versa. In particular, at each instant the two systems acquire the respective images of distinct and nearby surface portions belonging to the same desired surface region. By synchronising the relative movement of the surface with the acquisition of the two different images, it is possible to obtain the complete image of the entire desired surface region in the two types, respectively by combining the two respective series of images obtained on the same series of surface portions.

The Applicant also believes that the movement of the surface portion with motion substantially orthogonal to the first axis allows an optimal arrangement of two acquisition systems for the purposes of compactness of the device, for example it allows arranging them side by side substantially parallel to each other (i.e. with the first optical axis substantially parallel to the second optical axis).

The present invention, in one or more of the above aspects thereof, may further have one or more of the preferred features described hereinafter.

Preferably, said first acquisition system is adapted to acquire two-dimensional images.

Preferably, said second acquisition system is adapted to acquire three-dimensional images.

Preferably, said second camera is a matrix camera.

Preferably, said second illumination system comprises a laser source adapted to emit a linear beam having a propagation plane.

Preferably, said second optical axis is inclined with respect to said propagation plane.

In this way, advantageously, the device is adapted to simultaneously acquire both 2D images and 3D images (laser triangulation) of the same surface region.

Preferably, said translation plane also passes through a second intersection region between said propagation plane and said second depth of field.

The Applicant notes that the combination of 2D and 3D technologies is in line of principle made difficult by the different optical paths, the different cameras, the different optics, the different focal apertures, the different exposure times, the different elementary light sources, etc. The Applicant, however, believes that by combining on one device two different acquisition systems, one 2D and one 3D, where the laser line of the 3D system is sufficiently focused by the respective camera (i.e. falls within its depth of field) at least on said translation plane, it is possible to acquire simultaneously both the 2D images and the 3D images of the same surface region of the tyre, which is locally substantially planar and lying in the vicinity of said translation plane, moving, relatively to the device, the tyre surface on such a translation plane or in the vicinity thereof. Moreover, said solution allows obtaining a high quality of the 2D and 3D images detected.

Typically, a beam of (infinite) of translation planes exists, passing by said first focal point and substantially orthogonal to said first optical axis, preferably passing by said first intersection region between said second optical axis and said second depth of field.

Typically, a beam of (infinite) of translation planes exists, passing by said first focal point and substantially orthogonal to said first optical axis, preferably passing by said second intersection region between said propagation plane and said second depth of field.

Preferably, said at least one translation plane is a plane perpendicular to said first optical axis.

Preferably, said at least one translation plane coincides with said first focal plane. In other words, the focal plane is orthogonal to the first optical axis, as typically occurs, for example when the system is free of devices that rotate the focal plane (see hereinafter with reference to the 3D system). In this way, the first acquisition system, as such, and the device as a whole, is particularly simple and compact.

Preferably, said at least one translation plane passes through a second focal point which is situated on an intersection between said propagation plane, said second focal plane and said second optical axis. In this way, the second 3D acquisition system puts the surface moving along the translation plane exactly in focus.

Preferably, said first camera is linear and has an objective line lying on an intersection between said first focal plane and an optical plane passing through said first optical axis and a linear sensor of said linear camera. In this way, it is possible to acquire images of extended curved surface regions of the tyre (preventing the problems of focus and/or illumination uniformity), through the acquisition in succession and combination of a series of linear images obtained by gradually sliding the surface region at (or in the proximity of) the objective line.

Preferably, said objective line and an intersection line between said translation plane and said propagation plane are parallel to each other and aligned with respect to a translation direction orthogonal thereto and belonging to the translation plane. Advantageously, this makes it possible to acquire the 2D and 3D digital images of the same surface region (e.g. circumferential) by means of the relative translation of the region along the translation direction (and the acquisition in succession of respective 2D and 3D images of the same series of linear portions of the surface region), while keeping the device compact since the two acquisition systems can be arranged side by side along the translation direction.

Preferably, said second camera is arranged on the side opposite said first camera with respect to the laser source. In this way, advantageously, the overall dimensions of the device are reduced and the acquisition lines of the 2D and 3D systems can be arranged close. In fact, typically, the optical path of the laser (i.e. the distance between the front surface of the laser and the intersection line between the propagation plane and the translation plane) is greater than the optical path of the second camera (i.e. the distance between the front surface of the objective and said intersection line). If the laser was in an outer position, i.e. with the second camera interposed between the first camera and the laser, the device as a whole would have greater lateral dimensions.

Preferably, said propagation plane is parallel to said optical plane of the first camera. This is to reduce the overall dimensions of the device (especially when synergically combined with the solution of the previous paragraph). Moreover, in this configuration, in which the second optical axis is inclined with respect to the normal to the translation plane, the second focal plane is inclined with respect to the translation plane, i.e. the lying plane of the tyre surface. This arrangement also occurs without devices that tilt the second focal plane with respect to the second optical axis (see hereinafter). In this situation, the second depth of field to focus the desired height excursion of the surface, is less than the configuration in which the second focal plane lies parallel to the tyre surface.

Typically, the second camera comprises a second sensor defining a second image plane and a second objective.

Preferably, the device comprises an opaque separator interposed between said first illumination system and said first intersection region. More preferably, the device opaque separator is interposed between said first illumination system and said second intersection region.

Preferably, said first illumination system is adapted to emit within a first optical band and said second laser source is adapted to emit within a second optical band substantially separate from said first optical band.

Preferably, the second acquisition system comprises an optical filter (e.g. interferential) optically arranged in front of an objective of the second camera and adapted to let said second optical band through and to substantially block said first optical band. For example, the second laser source can emit at a central wavelength of 670 nm, far enough from the band emitted by a red LED embedded in the second illumination system with white light, so that the second system is less disturbed by the LED illuminator, making the interference filter as effective as possible while remaining in the visible and thus remaining in the 3R safety class of the laser.

One or both of the two above solutions prevent or mitigate the interference of light in the two zones (lines) the images of which are acquired, in particular the laser is prevented from being dominated by the light of the LEDs in said intersection region of the propagation plane with the second depth of field.

Preferably, the device comprises a secondary support frame on which said first illumination system is rigidly mounted.

In one embodiment, said secondary support frame is movably mounted on the support frame so as to translate rectilinearly.

Preferably, the rectilinear translation occurs along a direction substantially parallel to said first optical axis, from a position proximal to the first camera to a position distal to said first camera. This configuration advantageously allows moving and inserting the device in relatively narrow spaces, such as the space delimited by the tyre beads. Only after having avoided the most protruding parts (e.g. a bead arranged above), the lighting bodies are moved to a very small distance from the inner surface, in the position of maximum illumination of the area of interest and focus.

In one embodiment, a secondary support frame is provided on which said first illumination system is rigidly mounted, wherein the first and second camera and the second illumination system are rigidly mounted on said support frame in proximity to a first end of the device, and said secondary support frame is rigidly fixed to said support frame in proximity to a second end of the device longitudinally opposite the first end, wherein a distance along the first optical axis between an external optical surface of said first camera and said first focal point is greater than or equal to 250 mm. More preferably, said distance is greater than or equal to 300 mm. In this way, the objective of the first camera is far away enough from the first focal plane to allow using an objective for the first camera at a quite long focal length, such as greater than 35 mm, for example 50 mm, which typically has better resolution and/or aperture or brightness (f/N number with N focal ratio), with the same height of the framed field.

Preferably, said first illumination system includes a first light source, a second light source and a third light source adapted to emit a first light radiation, a second light radiation and a third light radiation, respectively, to illuminate said around the first focal point (e.g. said objective line).

Preferably, said first light source and second light source lie on opposite sides, respectively, with respect to said optical plane.

More preferably, said first light source and second light source lie mirror-wise with respect to said optical plane and said third light source is interposed between said first and second source (i.e. is closest to the first optical axis of the first light source and of the second light source).

Preferably, each of said first light source and second light source is adapted to illuminate said around the first focal point (e.g. said objective line) with a respective grazing light, and said third light source is adapted to illuminate said around the first focal point (e.g. said objective line) with diffuse light.

Preferably, each of said first light source, second light source and third light source comprises one or more respective sub-sources, each having a respective prevailing development direction substantially parallel to said objective line.

Preferably, said third light source comprises a plurality of respective sub-sources distributed on both sides of said optical plane.

More preferably, said sub-sources are distributed symmetrically with respect to said optical plane.

Even more preferably, said sub-sources are at least four. In this way, a uniform illumination of the objective line with diffused light is obtained and the source group is made particularly compact.

Preferably, the first light source and the second light source comprise each a single sub-source. In this way, they produce a respective directional radiation, preferably grazing.

Preferably, said respective sub-sources are structurally and/or dimensionally equal to each other. In this way, the source group is simplified in design, operation and maintenance.

Preferably, said respective sub-sources have a rectilinear development along the prevailing development direction. This allows reducing the overall dimensions while maintaining a high lighting efficiency.

Preferably, the sub-sources of the first light source, second light source and third light source are arranged on a line on a plane orthogonal to the objective line, with concave side facing toward the objective line. In one embodiment, said sub-sources are equidistant from said objective line (i.e. they are distributed over an arc of a circle). Preferably, all the sub-sources lying on one side of said optical plane are distributed mutually equally spaced. In this way, it is easier to adjust the light intensity incident on the objective line.

Preferably, said first illumination system (e.g. each of said sub-source of the first light source, second light source and third light source) includes one or more support bodies and one or more elementary light sources (e.g. LED type).

Preferably, a thermal glue is interposed in contact between said first illumination system (e.g. said support bodies) and a secondary support frame.

Preferably, said secondary support frame consists of a pair of opposite side walls and a bottom wall interposed between the side walls, where the side walls are fixed to the bottom wall, and where a thermal glue is interposed in contact between each side wall and the bottom wall.

Preferably, said support bodies are interposed between the side walls and fixed to the latter, where a thermal glue is interposed in contact between the support bodies and the side walls.

Preferably, said support frame and/or said secondary support frame and/or said support bodies are made of aluminium.

Preferably, said support bodies and/or said secondary support frame (e.g. said bottom wall) are provided with a ribbing, more preferably arranged in a manner such to be vertically situated during use.

One or more of the features of the three preceding paragraphs solve or mitigate the problem whereby the high heat generation by the elementary light sources of the first illumination system (in particular of the LEDs) can cause a temperature rise which can result in a blockage/switching off of the LEDs themselves. In particular, the use of aluminium and/or thermal glue helps carrying the heat generated away from the elementary light sources, the ribbing helps dispersing it in the environment and the vertical arrangement, in use, of the ribbing promotes the onset of convective motions which increase the heat exchange.

Preferably, said support bodies have a circle-shaped cross section to allow their placement at a close distance.

Preferably, the device comprises a drive and control unit for said first and second acquisition system (rigidly) mounted on said support frame, the drive and control unit being adapted to turn on said first and second illumination system and to activate said first and second camera simultaneously with the turning on of the respective lighting systems.

This reduces the impedance of the power cables of the acquisition systems (particularly of the light sources) and thereby rise and fall times of the light sources switch on current (e.g. the LEDs) and it also reduces the extent, both as weight and as number/overall dimensions of the cables to be handled.

Preferably, the drive and control unit is configured for:
activating, in alternating sequence, said first light source, second light source and third light source; and
driving said first camera for respectively acquiring a first, second and third image synchronously with the activation of said first light source, second light source and third light source, respectively. In this way, it is possible to acquire both an image in diffuse light and two images in grazing light.

In a further aspect thereof, the invention relates to a station for analysing tyres in a tyre production line.

Preferably, the station comprises a support adapted to support the tyre set on a sidewall and to rotate the tyre around a rotation axis thereof.

Preferably, said rotation axis is arranged vertically.

Preferably, said movement member of the device is a robot arm.

More preferably, said movement member is an anthropomorphic robot arm.

Even more preferably, said movement member is an anthropomorphic robot arm with at least five axes.

Preferably, the device comprises a single system of detection of the angular position of said support (such as an encoder), a drive and control unit being configured for turning on said first illumination system and second illumination system and activating said first camera and second camera as a function of a single angular position signal of the support sent by said single system for detecting the angular position. In this way, the succession of linear surface portions is correctly acquired regardless of the speed of rotation of the tyre and the acquisition logic of the two cameras is released from the control logic of the rotation and the control homogeneity of the devices is preserved.

Preferably, said distinct portions of said region are linear surface portions.

Further features and advantages will become more apparent from the detailed description of some exemplary but non-limiting embodiments of a device and a station for analysing tyres in a tyre production line, according to the present invention. Such description will be given hereinafter with reference to the accompanying figures, provided only for illustrative and, therefore, non-limiting purposes, in which.

Figure 8A:
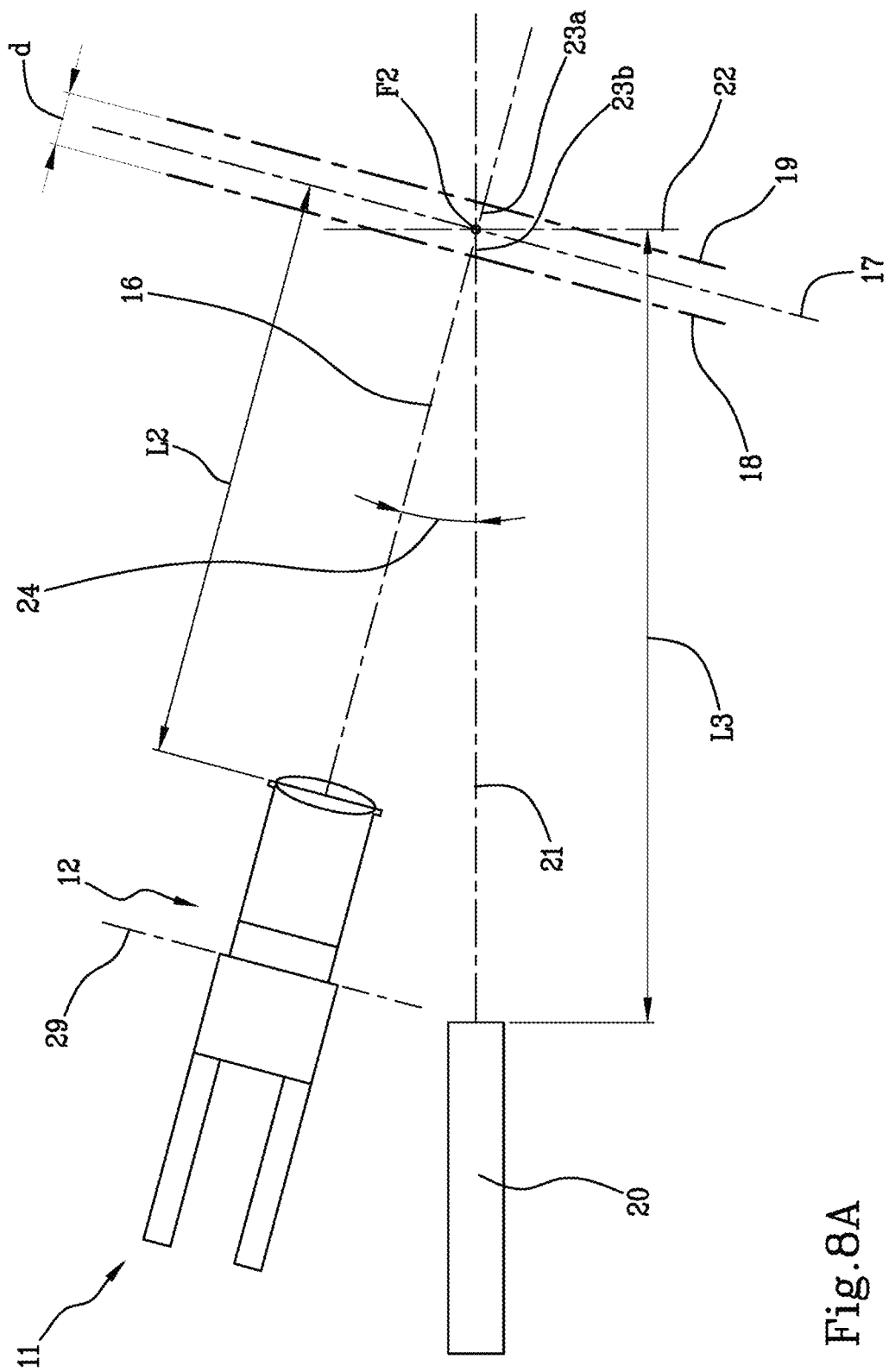
Figure 8B:
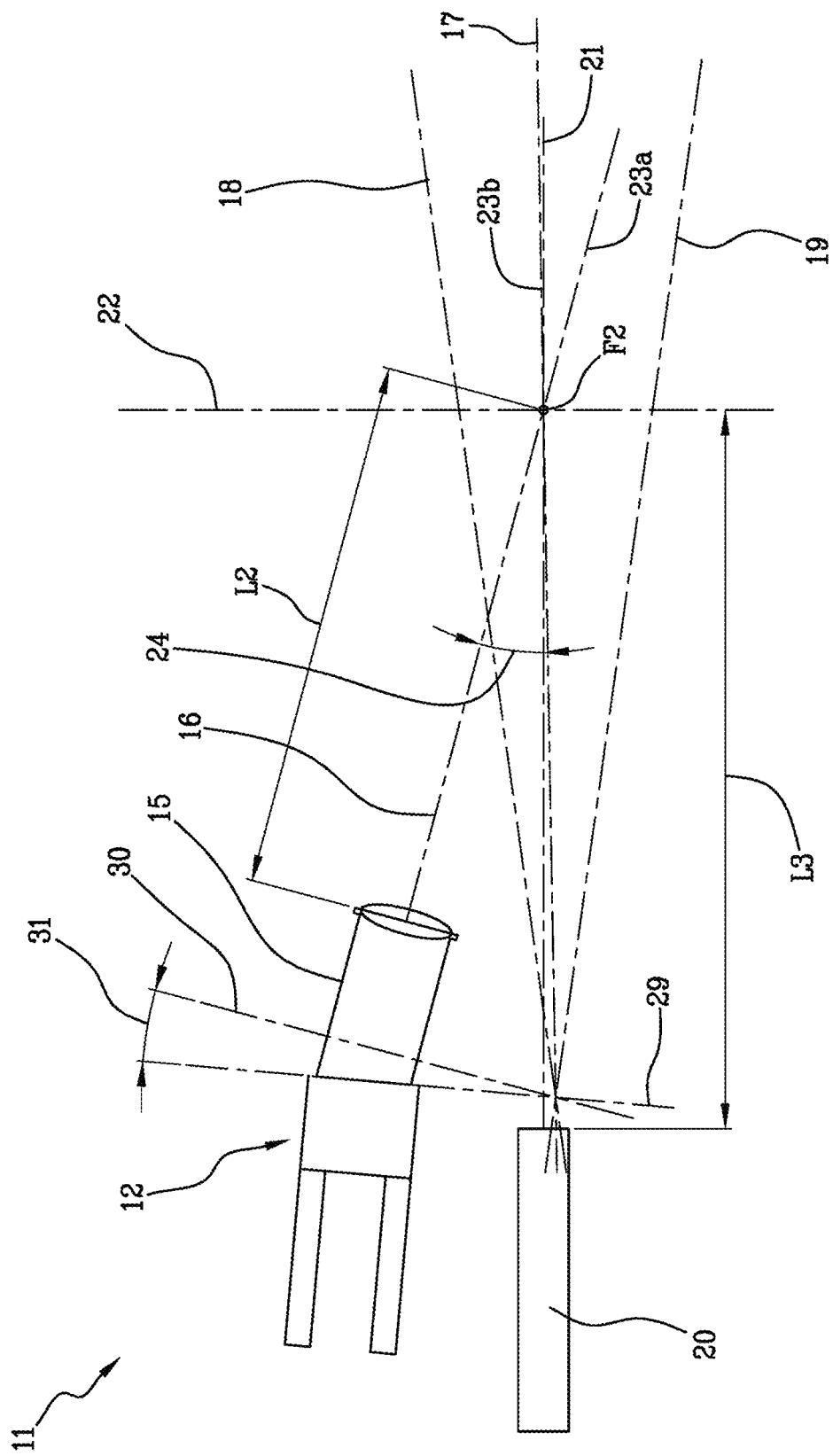
Figure 9:
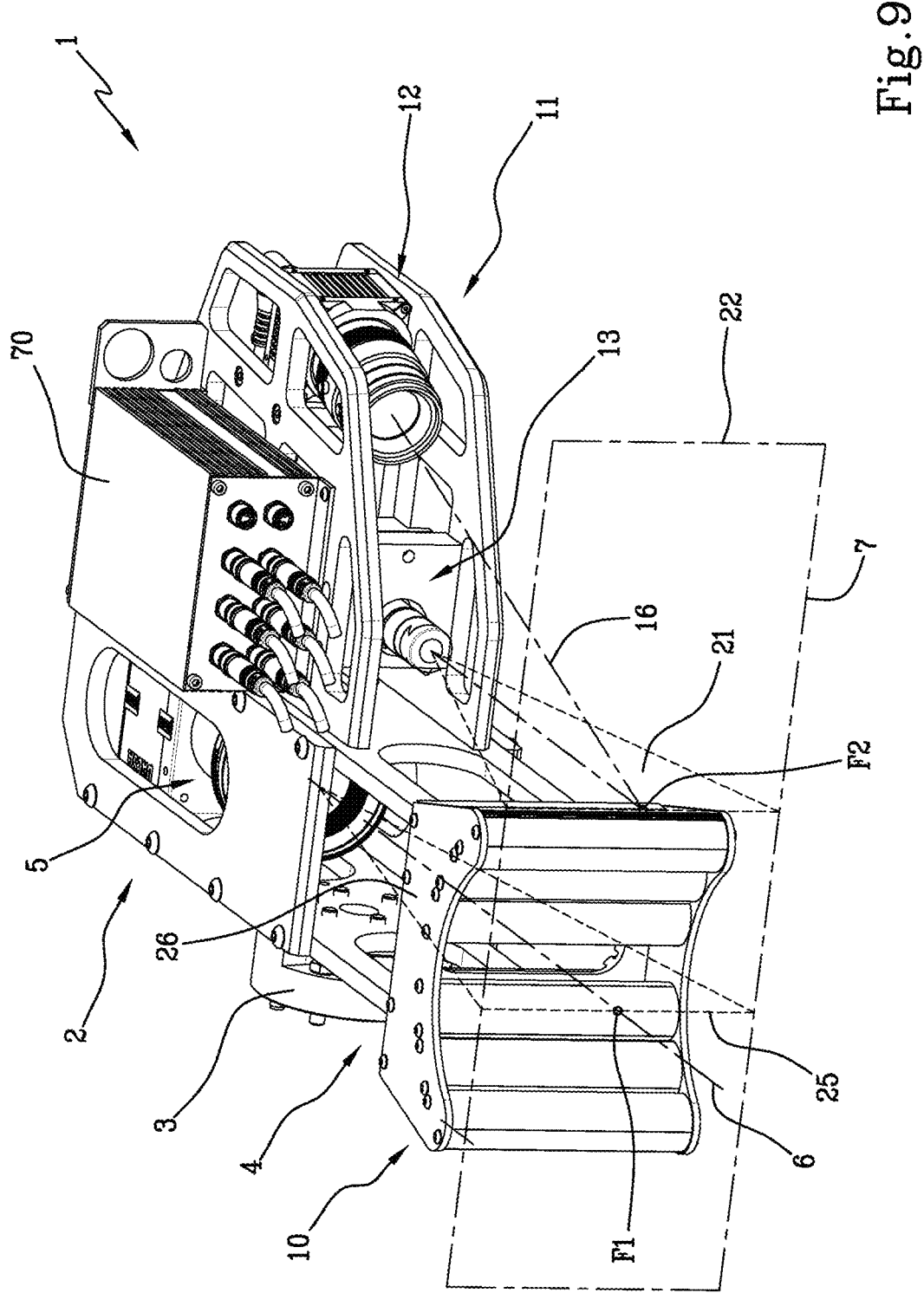
Figure 10:
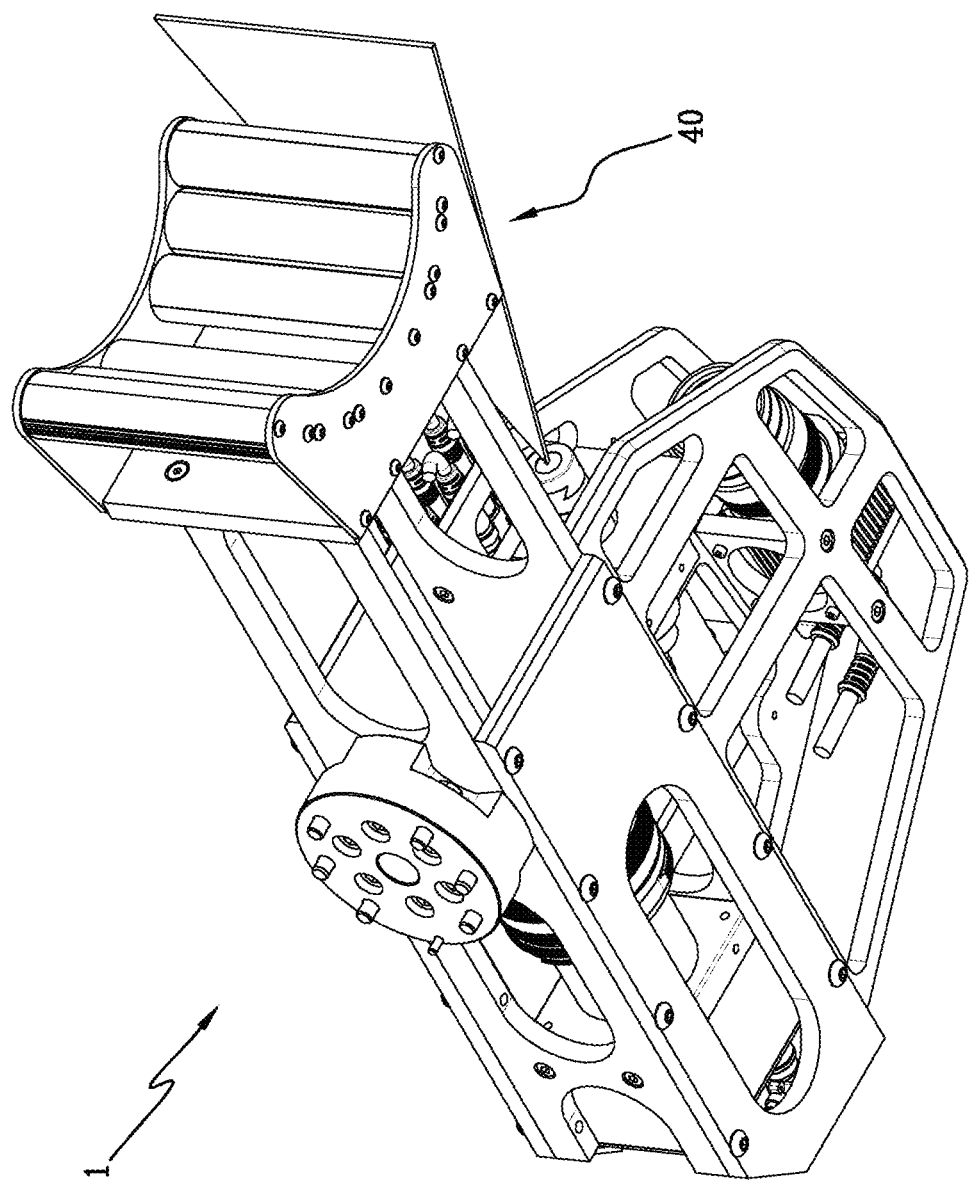
Figure 11:
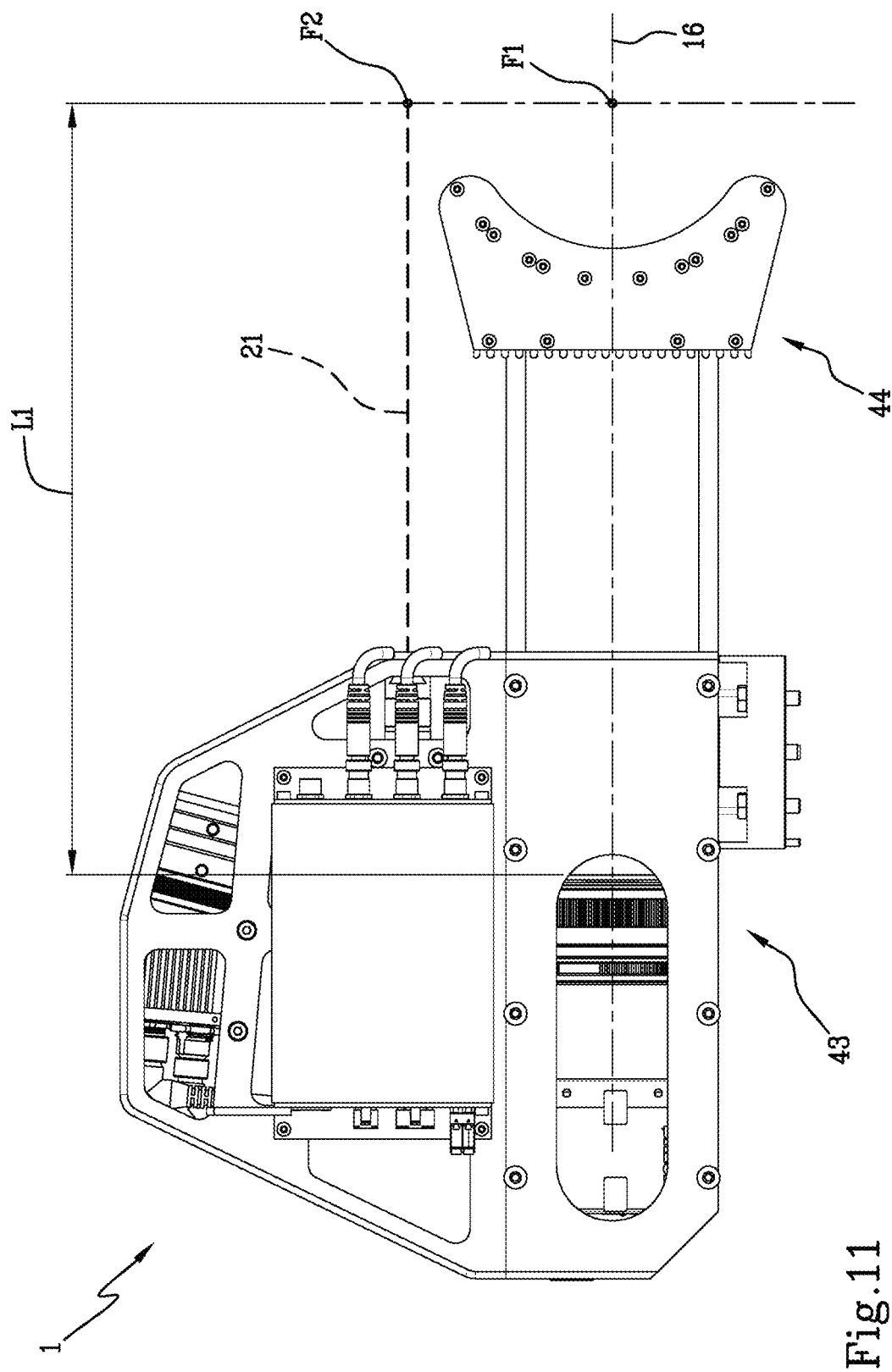
Figure 12:
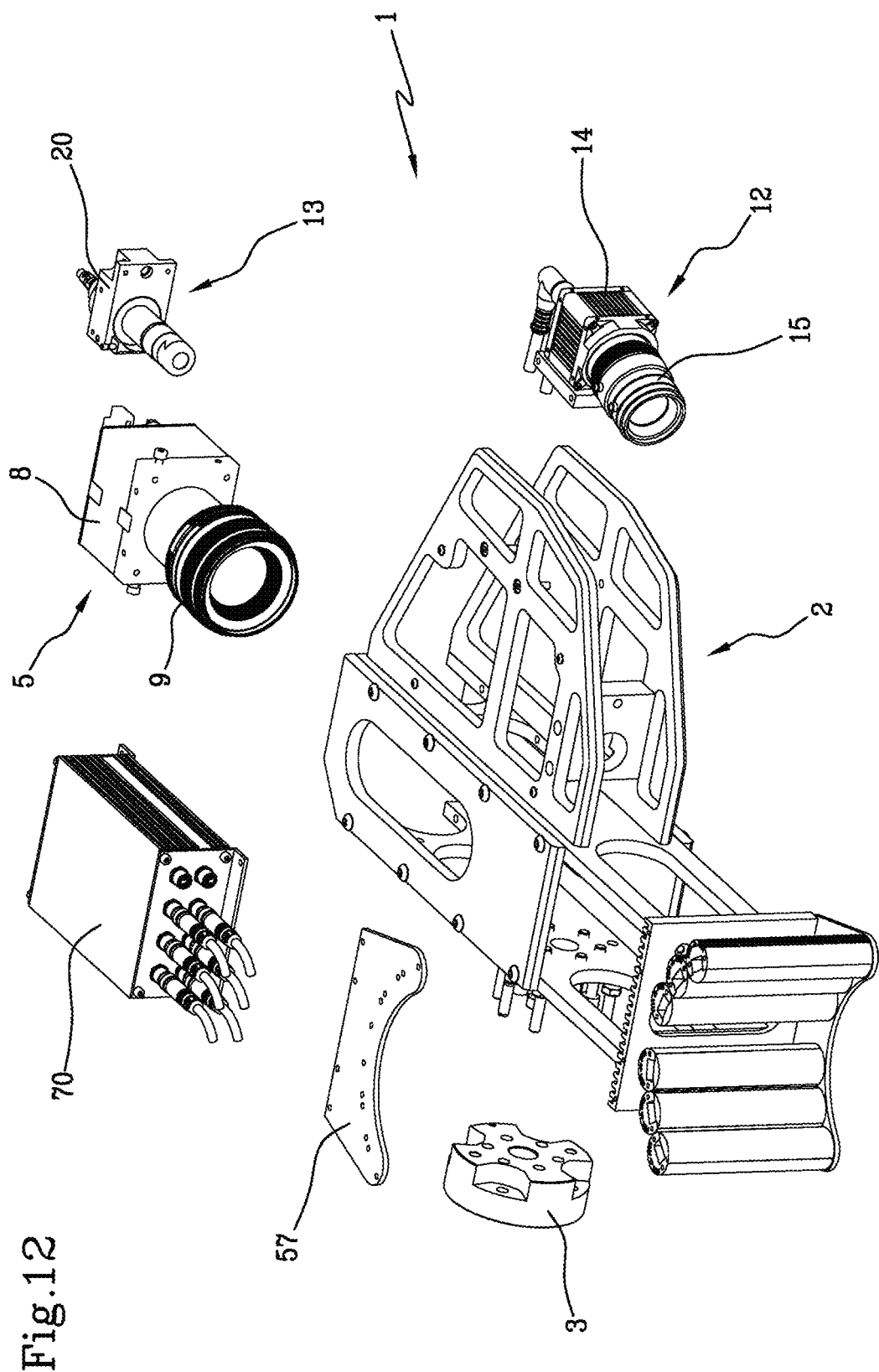
Figure 13:
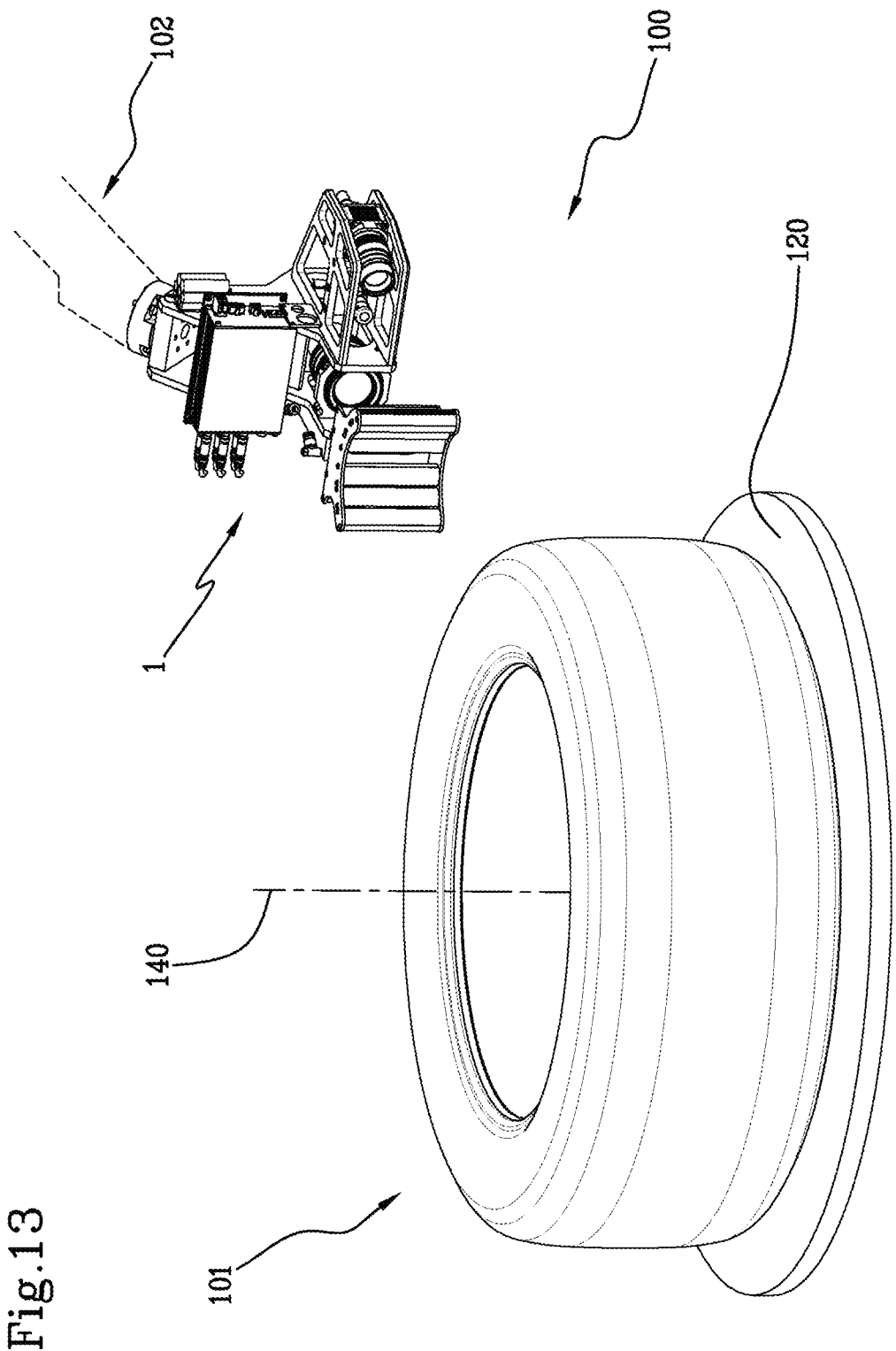

FIGS. 8A and 8B schematically show two possible optical configurations of the second acquisition system according to the present invention, respectively;

FIGS. 9-12 show a partial and schematic view of a further embodiment of a device according to the present invention, in a perspective view from two views, in a top view and partially exploded view, respectively;

FIG. 13 shows a schematic and partial view of a station for analysing tyres according to the present invention.

With reference to FIG. 13, reference numeral 100 indicates a station for analysing tyres in a tyre production line.

Preferably, the station comprises a support 120 (for example a fifth wheel) adapted to support tyre 101 set on a sidewall and to rotate the tyre around a rotation axis 140 thereof (preferably arranged vertically).

Station 100 comprises a device 1 for analysing tyres.

Preferably, the station comprises a movement member 102 (only shown schematically) on which device 1 is mounted for the movement thereof in space. Preferably, the movement member of the device is a robot arm, more preferably an anthropomorphic robot arm, even more preferably an anthropomorphic robot arm with at least five axes. It is noted that advantageously, device 1 is inserted within the tyre from the top and not from the bottom through support 120.

Device 1 comprises a support frame 2 and a flange 3 for attaching the support frame to the device movement member.

Figure 3:
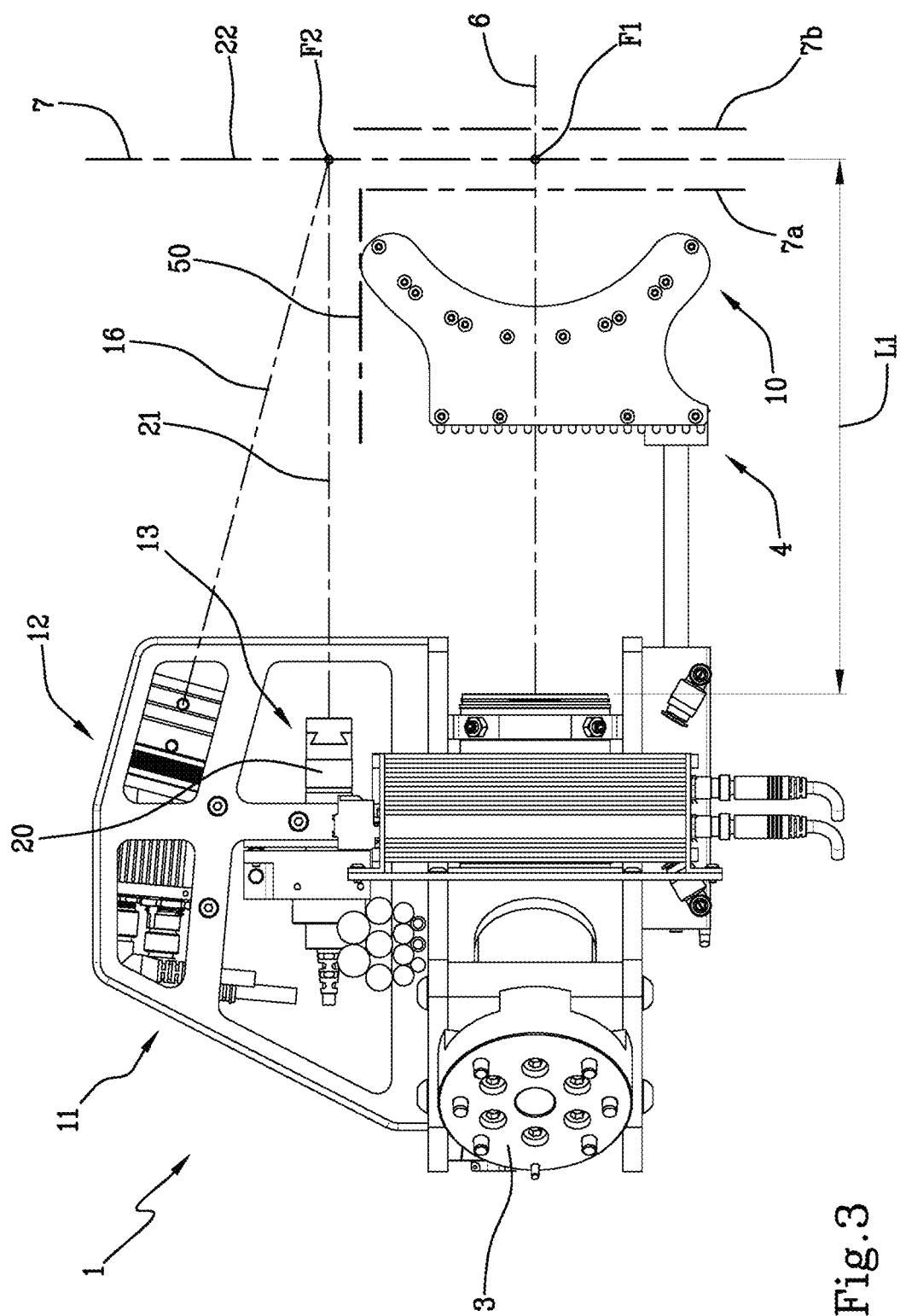
FIG. 3 shows a top view of the device in FIG. 1.
Figure 4:
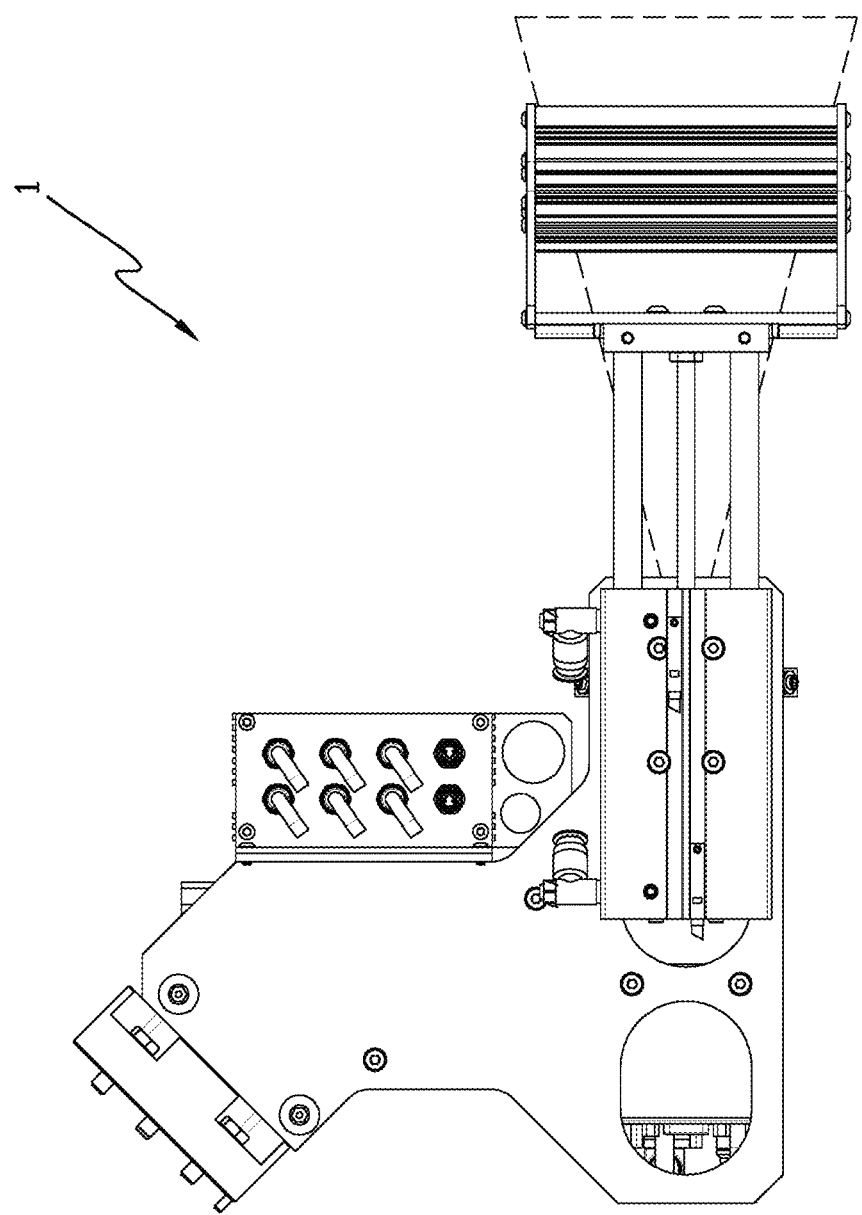
FIG. 4 shows a side view of the device in FIG. 1.
Figure 5:
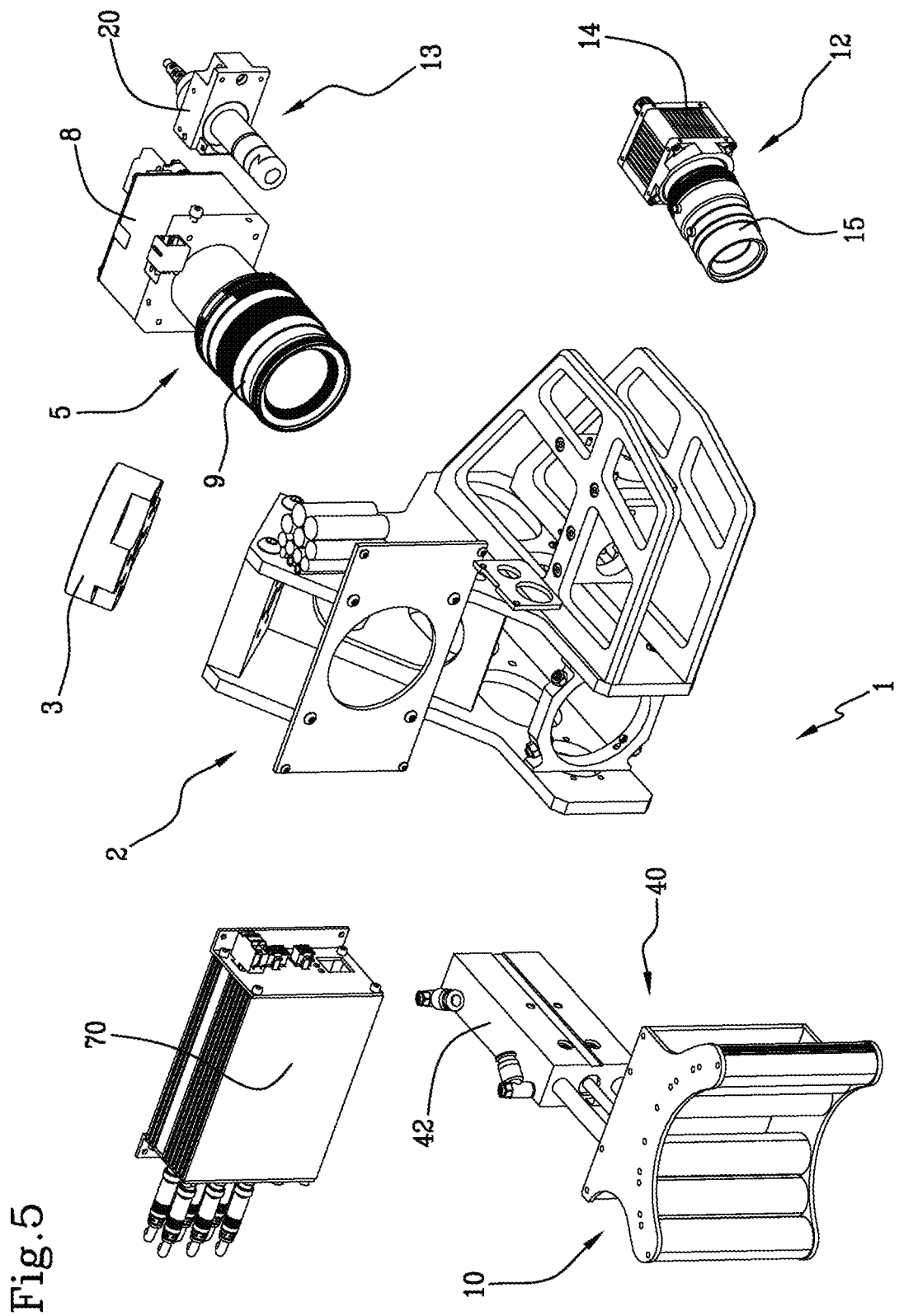
FIG. 5 shows a partially exploded view of the device in FIG. 1.
Figure 6:
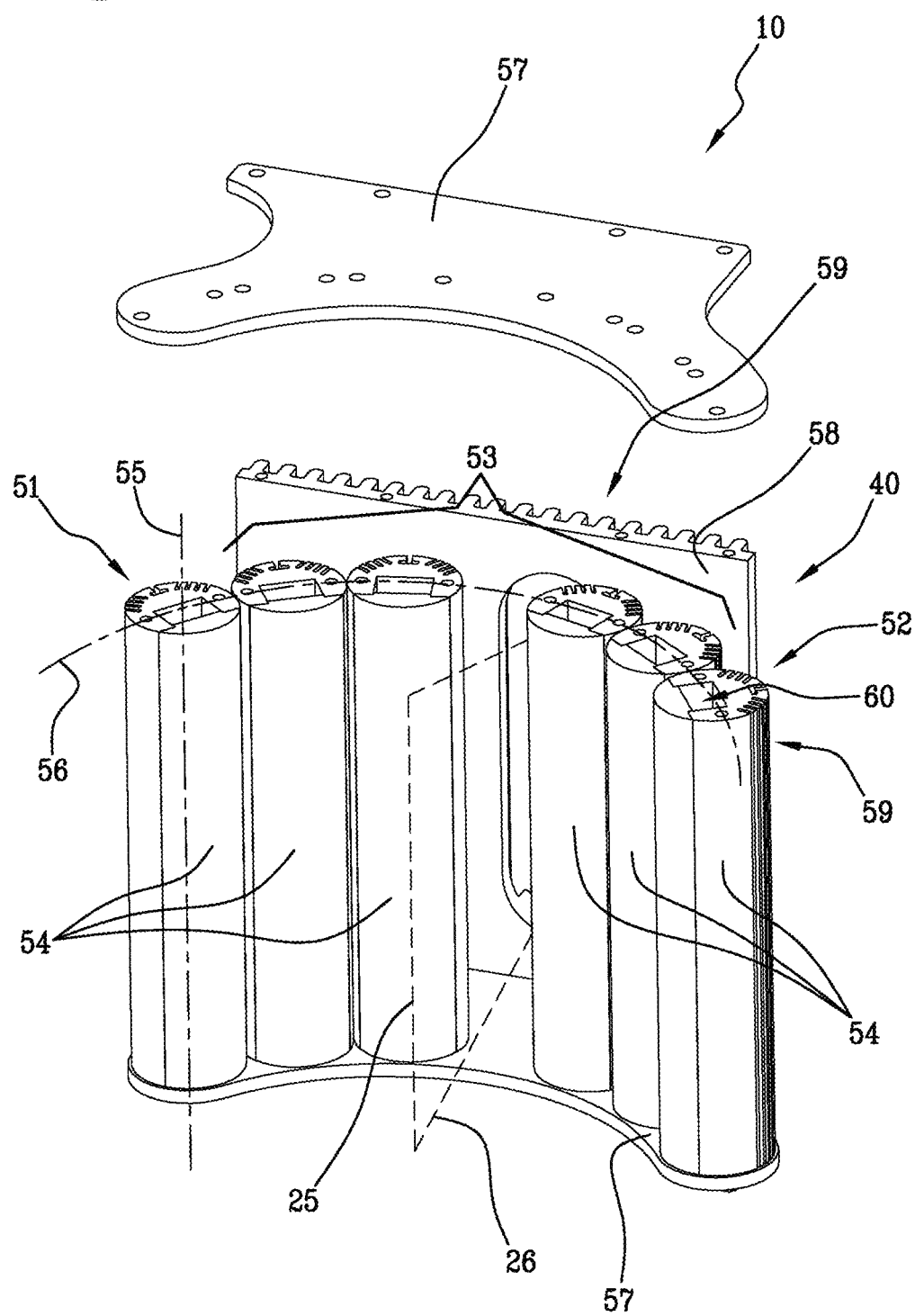
FIG. 6 shows a partially exploded view of a detail in FIG. 5.

Preferably, the device comprises a first acquisition system 4 of images, preferably two-dimensional, of a tyre surface mounted on the support frame. The first acquisition system 4 typically comprises a first camera 5, having a first optical axis 6, a first focal plane 7 and a first depth of field (FIG. 3 exemplarily shows the end planes 7a, 7b of the first depth of field). Typically, the first camera has a first machine body 8 (housing the sensor and the electronics) and a first objective 9 (housing the lenses).

The first acquisition system 4 typically comprises a first illumination system 10 adapted to illuminate around a first focal point F1 which is situated on an intersection between the first optical axis and the first focal plane.

Preferably, the device comprises a second acquisition system 11 of images, preferably three-dimensional images of the surface mounted, preferably rigidly, on the support frame.

The second image acquisition system 11 comprises a second camera 12 (typically consisting of a respective second machine body 14 and second objective 15) and a second illumination system 13.

Preferably, the second camera is a matrix camera and is characterised by a second optical axis 16, a second focal plane 17 and a second depth of field (FIGS. 8A and 8B show the end planes 18, 19 of the second depth of field).

Preferably, the second illumination system 13 comprises a laser source 20 adapted to emit a linear beam having a propagation plane 21, where the second optical axis 16 is tilted with respect to the propagation plane.

Preferably, there is at least one translation plane 22 passing through the first focal point F1 and forming an angle of between 90°+15° and 90°−15° with the first optical axis and also passing through a first intersection region 23a between said second optical axis 16 and the second depth of field. It is noted that the first intersection region 23a is a rectilinear segment.

Preferably, said translation plane 22 also passes through a second intersection region 23b between the propagation plane 21 and the second depth of field. It is noted that the second intersection region 23b is a flat surface.

For the purposes of clarity, the figures show a translation plane 22 exactly orthogonal to the first optical axis, but it may be any plane of the bundle of planes passing through the first focal point F1 and substantially orthogonal to the first optical axis which also pass through the first intersection region 23a and preferably the second intersection region 23b.

In the figures, moreover, the translation plane 22 considered coincides with the first focal plane 7, but the present invention also covers embodiments (not shown) in which the first focal plane is tilted with respect to the plane orthogonal to the optical axis (for example by means of devices of the type shown in FIG. 8B with reference to the second acquisition system).

Preferably, the translation plane 22 passes through a second focal point F2 which is situated on an intersection between the propagation plane 21, the second focal plane 17 and the second optical axis.

Preferably, the first camera is linear and is characterised by an objective line 25 lying on the intersection between the first focal plane and an optical plane 26 passing through the first optical axis and the linear sensor of the linear camera. Exemplarily, the objective line is about 100 mm in length.

Figure 1:
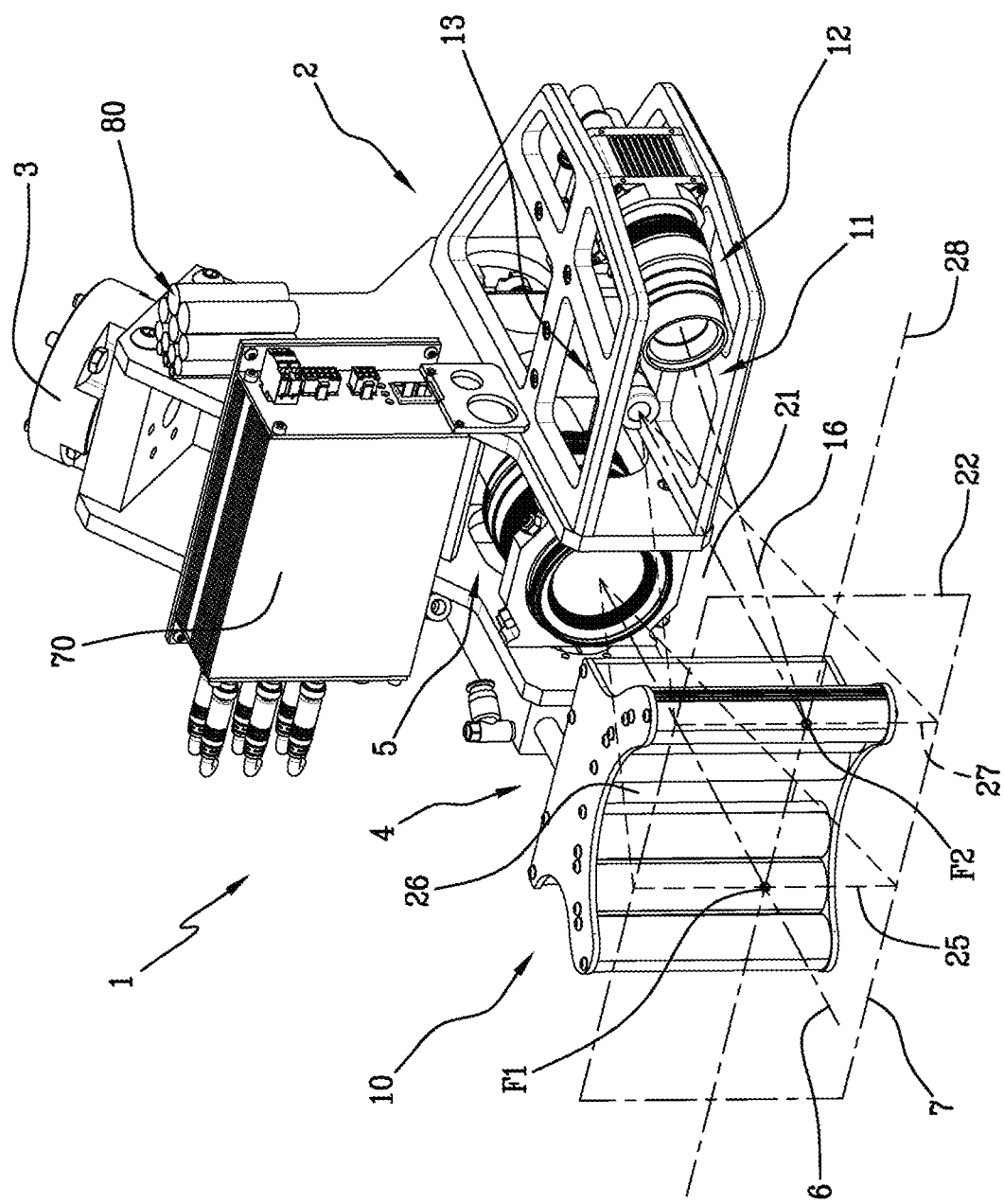
FIG. 1 shows a partial and schematic perspective view of a device for analysing tyres according to the present invention.
Figure 2:
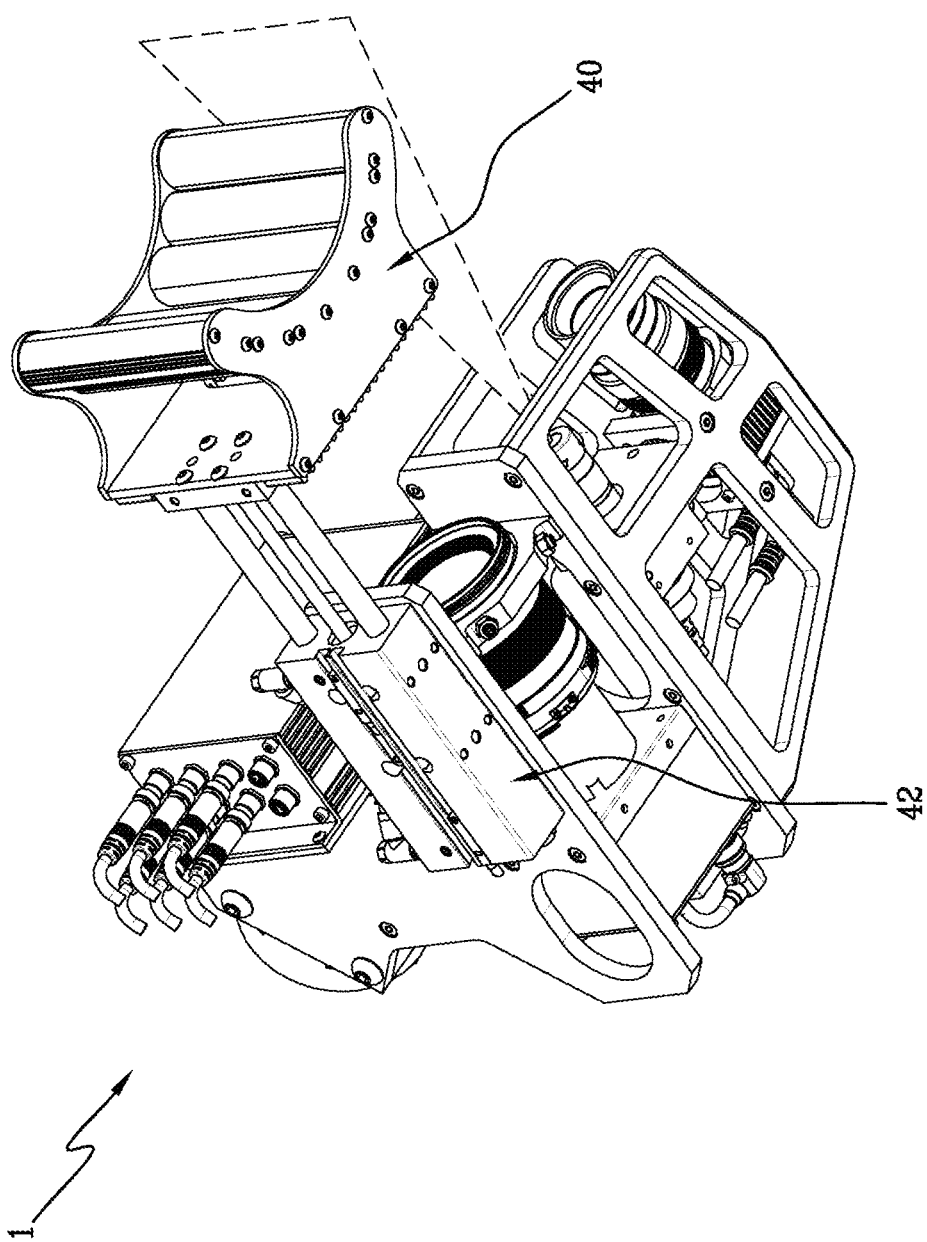
FIG. 2 shows a further perspective view of the device in FIG. 1 from a different view.

Preferably, the objective line 25 and an intersection line 27 between the translation plane 22 and the propagation plane 21 are parallel to each other and substantially aligned with respect to a translation direction 28 orthogonal thereto and belonging to the translation plane (see for example FIG. 1).

Preferably (as exemplarily shown in the figures), the second camera 12 is arranged on the side opposite the first camera 5 with respect to the laser source 13.

FIGS. 8A and 8B schematically show a top view of the second acquisition system 11 in two respective embodiments of the present invention.

In both figures, the second optical axis 16 forms an acute angle 24 with the propagation plane exemplarily equal to 15°.

Exemplarily, distance L2 along the second optical axis between an outer optical surface of the second camera and the second focal point is equal to 210 mm and distance L3 along the propagation axis between an outer optical surface of the laser source and the second focal point is equal to 285 mm.

In FIG. 8A, the second optical axis is, as typically happens, orthogonal to the image plane 29 of the sensor. In this situation, the focal plane 17 is also orthogonal to the second optical axis, as are the extreme planes 18 and 19 of the depth of field. Assuming that the maximum altimetric excursion to be detected on the tyre surface is equal to h (for example of the order of a few tens of mm), since the tyre surface (more precisely a plane thereof at a given height) being analysed lies substantially on the translation plane 22, it follows that the length d of the depth of field should be such as to at least include such an excursion h on the propagation plane 21.

As mentioned above, the term 'lying in the proximity of the translation plane' means that the local lying plane of the surface (defined as any plane passing through a given height of the tyre surface, preferably the plane passing through the intermediate height of the maximum height excursion of the surface) at said first optical axis remains within said first depth of field (said lying plane being coinciding with said at least one translation plane when the lying plane of the surface passes through the first focal point).

In the configuration in FIG. 8, where the propagation plane 21 is orthogonal to the translation plane 22 (and parallel to the optical axis of the first camera) and where the second optical axis is tilted with respect to the normal to the translation plane, the second focal plane 17 is tilted with respect to the translation plane 22. In this situation, the length d of the depth of field along the second optical axis must be greater than or equal to $d_{min} = h \ast \cos \alpha$, where $\alpha$ is the width of the acute angle 24. Therefore, such a minimum length $d_{min}$ is less than a comparative configuration in which the second focal plane lies parallel to the translation plane 22, where $d_{min} = h$.

Preferably, as shown in FIG. 8B, the image plane 29 of the camera sensor forms, with a reference plane 30 orthogonal to the second optical axis and passing by the second objective 15, an acute angle 31 with vertex on the side where the laser source is, and exemplarily equal to 10°.

In this way, the second focal plane 17 forms an almost null acute angle with the propagation plane 21, and the second depth of field, in the region of interest around the translation plane 22 develops around the propagation plane 21, allowing easy focusing of the reflected laser line along excursion h, even with open aperture.

Preferably, the device comprises an opaque separator 50 (only schematically shown in FIG. 3) interposed between the first illumination system 10 and the first intersection region 23a. For example, the separator may be fixed to the secondary support frame 40. The opaque separator may be of rigid material (kept, in use, slightly distant from the tyre surface), or flexible material, such as a hair brush which in use slide on the surface.

Preferably, the device comprises a secondary support frame 40 on which the first illumination system is rigidly mounted.

Figure 7:
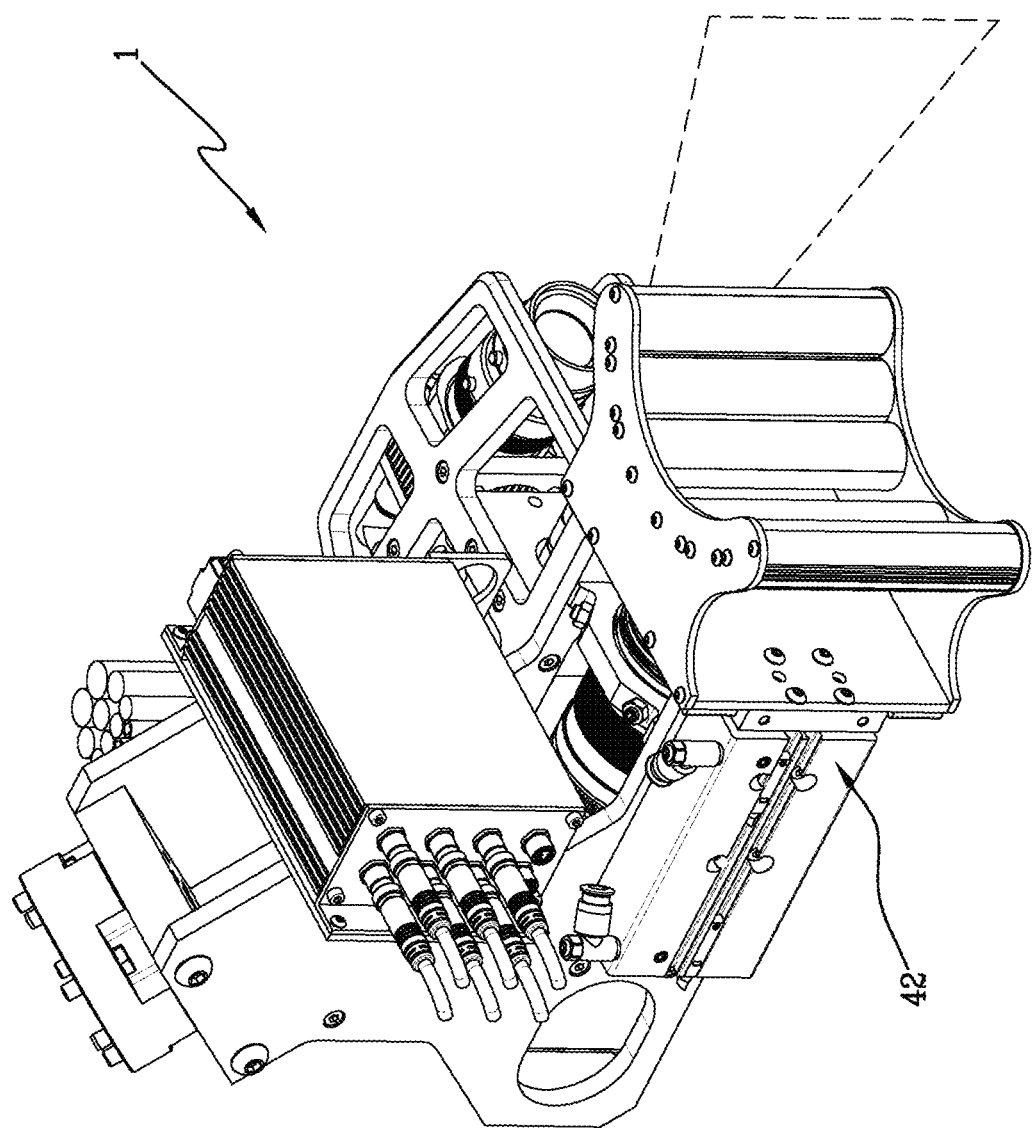
FIG. 7 shows a perspective view of the device in FIG. 1 in a retracted configuration.

In one embodiment, such as that exemplary shown in FIGS. 1-7, the secondary support frame is movably mounted on the support frame as to translate rectilinearly, preferably along a direction parallel to the first optical axis 6, from a position proximal to the first camera (as shown in FIG. 7) to a position distal from the first camera (FIGS. 1-4). Exemplarily, the device comprises a linear actuator 42 (e.g. pneumatic) rigidly mounted on the main support frame 2 and able to move rectilinearly one or more pistons at the distal end of which the secondary support frame is fixed.

In one embodiment, such as that exemplarily shown in FIGS. 9-12, the first and second camera and the laser source are rigidly mounted on the support frame in the proximity of a first end 43 of the device, and the first illumination system is rigidly mounted on the secondary support frame 40 in turn rigidly fixed to the support frame 2 in the proximity of a second end 44 longitudinally opposite the first end 43.

Exemplarily, distance L1 along the first optical axis between an outer optical surface of the first camera and the first focal point is equal to 320 mm and objective 9 of the first camera has a focal length of 50 mm.

By comparison, in the embodiment shown in FIGS. 1-4, such a distance L1, in the extracted configuration, is exemplarily equal to 220 mm and the objective used has a focal length of 35 mm.

Preferably, the first illumination system includes a first light source 51, a second light source 52 and a third light source 53 adapted to emit a first, a second and a third light radiation, respectively, to illuminate said around the first focal point (e.g. the objective line 25).

Preferably, the first light source 51 and the second light source 52 lie respectively on opposite sides and mirror-wise with respect to the optical plane 26 and the third light source 53 is interposed between the first and second source.

Preferably, each of the first and second light source is adapted to illuminate the objective line with a respective grazing light, and the third light source is adapted to illuminate the objective line 25 with diffuse light.

Preferably, each of the first light source, second light source and third light source comprises one or more respective sub-sources 54, each having a respective prevailing development direction 55 substantially parallel to the objective line.

Preferably, the third light source 53 comprises a plurality, such as four, of respective sub-sources 54 distributed symmetrically with respect to the optical plane.

Preferably, the first light source and the second light source comprise each a single sub-source 54.

Preferably, the respective sub-sources are structurally and/or dimensionally equal to each other.

Preferably, the respective sub-sources have a rectilinear development along the prevailing development direction 55.

Preferably, the sub-sources of the first, second and third light source are arranged on a line 56 on a plane orthogonal to the objective line, with concave side facing toward the objective line, exemplarily as an arc of a circle.

Preferably, all the sub-sources lying on one side of the optical plane are distributed mutually equally spaced.

Preferably, each sub-source 54 comprises a support body and one or, typically, more elementary light sources (e.g. LED type), not shown, housed in a cavity 60. Preferably, the support bodies have a circular cross section. In the figure, the support bodies are only schematically shown, it being understood that the front part of the support bodies is transparent and typically consists of a glass (e.g. diffuser) separate from the remainder of the support body. Such a glass front part has a LED protection function from external agents and acts as a lens adapted to concentrate the lighting rays emitted by the led itself, preventing the dispersion of light useful for the acquisition of images.

Preferably, the secondary support frame 40 consists of a pair of opposite side walls 57 and a bottom wall 58 interposed between the side walls, the side walls being fixed to the bottom wall, where a thermal glue is interposed in contact between each side wall and the bottom wall.

Preferably, the support bodies are interposed between the side walls 57 and fixed to the latter, where a thermal glue is interposed in contact between the ends of the support bodies and the side walls 57.

Preferably, the said support bodies and/or the bottom wall 58 are provided with a respective ribbing 59, arranged in a manner such to be vertically situated during use.

Preferably, the device comprises a drive and control unit 70 for the first and second acquisition system rigidly mounted on the support frame, the drive and control unit being programmed to turn on the first and second illumination system and activate the first and second camera simultaneously with the turning on of the respective lighting systems.

It is noted that in the figures, the power and/or control and/or communication cables are shown only in part.

Preferably, the drive and control unit is configured for:
activating, in alternating sequence, the first light source, second light source and third light source; and
driving the first camera for respectively acquiring a first, second and third image synchronously with the activation of the first light source, second light source and third light source, respectively.

The invention claimed is:

1. A device for analysis of tyres, comprising:
   i) a support frame and a flange configured to attach the support frame to a device movement member;
   ii) a first acquisition system configured to acquire images of a surface of a tyre, the first acquisition system being mounted on the support frame and comprising:
      a first camera comprising:
         a first optical axis;
         a first focal plane; and
         a first depth of field, and
      a first illumination system adapted to illuminate around a first focal point that is situated on an intersection between the first optical axis and the first focal plane; and
   iii) a second acquisition system configured to acquire images of the surface of the tyre, the second acquisition system being mounted on the support frame and comprising:
      a second camera comprising:
         a second optical axis;
         a second focal plane; and
         a second depth of field, and
      a second illumination system,
   wherein the first and second acquisition systems define a translation plane that is substantially orthogonal to the first optical axis, and passes through the first focal point and through a first intersection region between the second optical axis and the second depth of field.

2. The device according to claim 1, wherein:
   the first acquisition system is adapted to acquire two-dimensional images and the second acquisition system is adapted to acquire three-dimensional images,
   the second camera is a matrix camera,
   the second illumination system comprises a laser source adapted to emit a linear beam having a propagation plane, and
   the second optical axis is tilted with respect to said propagation plane.

3. The device according to claim 2, wherein the translation plane passes through a second intersection region between the propagation plane and the second depth of field.

4. The device according to claim 3, wherein the first and second acquisition systems define one or more additional translation planes, each substantially orthogonal to the first optical axis, and each passing through the first focal point, through the first intersection region, and through the second intersection region.

5. The device according to claim 1, wherein the translation plane is a plane orthogonal to the first optical axis and coincides with the first focal plane.

6. The device according to claim 2, wherein the translation plane passes through a second focal point that is situated on an intersection between the propagation plane, the second focal plane, and the second optical axis.

7. The device according to claim 1, wherein the first camera is a linear camera comprising an objective line that lies on an intersection between:
   the first focal plane, and
   an optical plane that passes through the first optical axis and a linear sensor of the linear camera.

8. The device according to claim 7, wherein the objective line and an intersection line between the translation plane and the propagation plane are parallel and aligned with respect to a translation direction orthogonal thereto and belonging to the translation plane.

9. The device according to claim 2, wherein the second camera is arranged on a side opposite the first camera with respect to the laser source.

10. The device according to claim 7, wherein:
    the propagation plane is parallel to the optical plane of the first camera, and
    the second focal plane is tilted with respect to the translation plane.

11. The device according to claim 1, further comprising an opaque separator interposed between the first illumination system and the first intersection region.

12. The device according to claim 2, wherein:
    the first illumination system is adapted to emit within a first optical band,
    the second laser source is adapted to emit within a second optical band substantially separated from the first optical band,
    the second acquisition system further comprises an optical filter optically arranged in front of an objective lens of the second camera, the optical filter being adapted to pass the second optical band and to substantially block the first optical band.

13. The device according to claim 1, further comprising a secondary support frame on which the first illumination system is rigidly mounted, wherein the secondary support frame is movably mounted on the support frame so that it can rectilinearly translate along a direction substantially parallel to the first optical axis, from a position close to the first camera to a position distal from the first camera, and vice versa.

14. The device according to claim 1, further comprising a secondary support frame on which the first illumination system is rigidly mounted, wherein:
  the first camera, the second camera, and the second illumination system are rigidly mounted on the support frame in proximity to a first end of the device,
  the secondary support frame is rigidly fixed to the support frame in proximity to a second end of the device longitudinally opposite the first end, and
  wherein a distance along the first optical axis between an external optical surface of the first camera and the first focal point is greater than or equal to 250 mm.

15. The device according to claim 7, wherein the first illumination system comprises:
  a first light source, a second light source, and a third light source, adapted to respectively emit a first light radiation, a second light radiation, and a third light radiation, to illuminate the objective line, wherein:
  the first light source and second light source respectively lie on opposite sides with respect to the optical plane and are mirrored with respect to the optical plane,
  the third light source is interposed between the first light source and the second light source,
  each of the first light source and the second light source is adapted to illuminate the objective line with a respective grazing light, and
  the third light source is adapted to illuminate the objective line with diffuse light.

16. The device according to claim 15 wherein:
  each of the first light source, the second light source, and the third light source, comprises one or more respective sub-sources,
  each of the one or more respective sub-sources comprises a respective main extension direction that is substantially parallel to the objective line,
  the third light source comprises a plurality of respective sub-sources distributed in a symmetric manner with respect to the optical plane,
  the first light source and the second light source each comprise only one sub-source,
  the sub-sources of the first light source, second light source and third light source are arranged on a plane orthogonal to the objective line and along an arc-of-a-circle having concavity directed towards the objective line, and
  each of the one or more respective sub-sources comprises a support body with a circular cross section and one or more elementary light sources.

17. The device according to claim 1, further comprising a secondary support frame on which the first illumination system is rigidly mounted, wherein:
  the first illumination system comprises one or more support bodies and one or more elementary light sources,
  the secondary support frame comprises a pair of lateral walls that are opposite each other and a bottom wall interposed between the lateral walls,
  the pair of lateral walls are fixed to the bottom wall via a thermal glue interposed in contact between each wall of the pair of lateral walls and the bottom wall, and
  the one or more support bodies are interposed between the pair of lateral walls and fixed thereto via a thermal glue interposed in contact between the one or more support bodies and the pair of lateral walls.

18. The device according to claim 17, wherein:
  the secondary support frame and the one or more support bodies are made of aluminium, and
  the one or more support bodies and the bottom wall are provided with respective ribbings configured to be vertically positioned during usage of the device.

19. The device according to claim 1, further comprising a drive and control unit that is mounted on the support frame,
  wherein the drive and control unit is adapted to turn on the first illumination system and the second illumination system, and to activate the first camera and the second camera simultaneously with a respective turning on of the first illumination system and the second illumination system.

20. A station for analysing tyres in a tyre production line, the station comprising:
  a support adapted to support the tyre set on a sidewall of the tyre, and to rotate the tyre around its rotation axis;
  the device according to claim 1; and
  the device movement member on which the device is mounted by means of the flange of the device.

21. The station according to claim 20, wherein the device movement member is a robotic arm comprising:
  a single system for detection of an angular position of the support;
  a drive and control unit configured to turn on the first illumination system and the second illumination system, and to activate the first camera and the second camera as a function of a single angular position signal of the support detected by the single system.

22. A method for analysing tyres, comprising:
  providing the device according to claim 1;
  translating, with respect to the device, a surface region of a tyre;
  based on the translating, maintaining the surface region above, or in proximity to, the translation plane of the device, at least at the first focal point of the device;
  activating the first acquisition system and the second acquisition system of the device; and
  based on the translating and the activating, simultaneously acquiring via the first and second acquisition systems of the device, respective series of images of a same series of distinct portions of the surface region.

23. The method according to claim 22, wherein the distinct portions of the surface region are linear surface portions.

* * * * *